United States Patent [19]
Kameishi et al.

[11] Patent Number: 5,766,790
[45] Date of Patent: Jun. 16, 1998

[54] SAFETY DEVICE FOR USE IN SECONDARY BATTERY

[75] Inventors: Toshizo Kameishi; Tadayuki Izawa; Koji Kihara; Akira Imoto, all of Gose; Toshiharu Hayashi, Gojo, all of Japan

[73] Assignee: Wako Electronics Co., Ltd., Osaka, Japan

[21] Appl. No.: 634,846

[22] Filed: Apr. 19, 1996

[30] Foreign Application Priority Data

| Apr. 21, 1995 | [JP] | Japan | 7-096796 |
| Apr. 21, 1995 | [JP] | Japan | 7-096848 |
| Sep. 10, 1995 | [JP] | Japan | 7-261724 |
| Nov. 7, 1995 | [JP] | Japan | 7-288622 |
| Nov. 7, 1995 | [JP] | Japan | 7-288845 |

[51] Int. Cl.[6] .................... H01M 10/50; H01M 20/12
[52] U.S. Cl. .................... 429/59; 429/57; 429/61; 429/62; 220/203.01; 220/203.08; 220/203.1
[58] Field of Search .................... 429/53–62, 82, 429/90, 7, 9, 122; 220/202, 203.01, 203.08, 203.15, 203.16, 203.09, 203.1

[56] References Cited

U.S. PATENT DOCUMENTS

| 3,617,386 | 11/1971 | Bosben et al. | 429/56 |
| 4,035,552 | 7/1977 | Epstein | 429/58 |
| 4,345,611 | 8/1982 | Ikeda et al. | 429/56 X |
| 4,431,716 | 2/1984 | Eppley et al. | 429/53 |
| 4,783,383 | 11/1988 | Machida et al. | 429/56 |
| 5,567,539 | 10/1996 | Takahashi et al. | 429/57 |

*Primary Examiner*—Anthony Skapars
*Attorney, Agent, or Firm*—Wenderoth, Lind & Ponack, L.L.P.

[57] ABSTRACT

A safety device for use in a secondary battery having a battery case formed with a hole open to outside of the battery case, and a generating unit airtightly housed in the battery case. The safety device includes a disk spring mounted on the battery case to close the hole and having one side thereof convexed toward the inside of the battery case. A switch is provided on the backside of the disk spring. It is adapted to change over under a stress applied from the disk spring when the disk spring bends backward so that the other side thereof is convexed toward the outside of the battery case. The switch is provided in a current flow path of the secondary battery.

4 Claims, 29 Drawing Sheets

SAFETY DEVICE FOR USE IN SECONDARY BATTERY

BACKGROUND OF THE INVENTION

This invention relates to a rechargeable secondary battery, particularly to its safety device that prevents explosion of the battery case in the events inner pressure rises excessively and a disk spring used in such a safety device.

With the spread of video cameras, headphone stereos and mobile phones, a demand is increasing for secondary batteries used as power sources for these gadgets and having improved heavy-load properties and high energy density. Batteries that answer these requirements include nickel-cadmium batteries. Lithium ion batteries are also gaining much attention these days. Development and marketing of lithium ion batteries are intensifying.

Secondary batteries of this type have their generating unit hermetically sealed in a battery case. Thus, if gas is produced from the generating unit due to overcharging or shortcircuiting, the pressure in the battery case will increase excessively. The perforation of the battery will thus drop. In an extreme case, the battery case may explode, damaging surrounding devices or harming people therearound.

Various safety devices are now available which can prevent explosion of secondary batteries. For example, Unexamined Japanese Patent Publication 4-58422 discloses a "pressure switch" that utilizes a diaphragm. A diaphragm can detect pressure with high accuracy. Namely, it can activate a switch means with high accuracy in response to the pressure in the battery case.

In another conventional arrangement, the battery case has a thin-walled portion. If the inner pressure exceeds a predetermined point, this thin-walled portion ruptures, exhausting the inner gas. The inner pressure thus drops. In other conventional arrangements, a means is provided for blocking the current flow path leading from the generating unit to the electrode if the inner pressure has risen to a predetermined level (Unexamined Japanese Patent Publications 2-288063, 5-343043, 5-347154, etc.).

In these conventional arrangements, if the inner pressure exceeds a predetermined point, the wall of the battery case or the current flow path is destroyed. Thus, in order to know the pressure at which these portions are destroyed, there is no other way but to actually destroy secondary batteries. It is of course impossible to subject all the products (batteries) to such destruction tests. Namely, 100% inspections are impossible. Rather, these devices are tested by sampling. Sampling tests are unreliable compared with 100% tests.

An object of this invention is to provide a safety device which can improve the safety of a secondary battery, more specially, to provide a safety device which can be inspected for its safety function without destroying it.

Another object of the invention is to provide a safety device which acts in response to not only the pressure in a secondary battery but also to its temperature.

A further object of this invention is to provide a disk spring which can be advantageously used for a safety device for a secondary battery.

SUMMARY OF THE INVENTION

The safety device, which is for use in a secondary battery having a battery case formed with a hole open to outside of the battery case, and a generating unit airtightly housed in the battery case, comprises a disk spring mounted on the battery case to close the hole and having one side thereof convexed toward the inside of the battery case, and a switch means provided on the backside of the disk spring and adapted to change over under a stress applied from the disk spring when the disk spring bends backward so that the other side is convexed toward the outside of battery case. The switch means is provided in a current flow path of the secondary battery.

With this arrangement, if the pressure in the battery case exceeds a permissible limit due to overcharging or shortcircuiting, the disk spring will bend backward, so that the switch means changes over. The current flow path is thus cut off. Overcharging or shortcircuiting is thus avoided.

Preferably, the switch means comprises a contact adapted to be deformed under a stress applied from the disk spring when the disk spring bends backward so that its other side is convexed, and a pair of terminals arranged so that while the front side of the disk spring is convex, the contact is kept in contact with both the terminals. Also, when the disk spring bends backward so that its other side is convexed toward the outside of the battery case and the contact is deformed, the contact separates from at least one of the terminals.

A passage may be provided whereby the disk spring can be pushed from its back with a pushing means (such as air, oil or a rod) introduced through the passage from outside the battery case. With this arrangement, it is possible to push the disk spring back to its original position to close the electric circuit again by moving the contact back into contact with both terminals.

The safety device, which is for use in a secondary battery having a battery case and generating unit airtightly housed in the battery case, comprises a conductor case having an opening and mounted on the battery case and formed with a pressure introducing hole through which the pressure in the battery case is introduced into the conductor case. A disk spring is provided to closing an opening of the conductor case and has its front side convexed toward the inside of the battery case. Also, a switch means is mounted in the conductor case and is adapted to change over under a stress applied from the disk spring when the disk spring bends backward so that its backside is convexed toward the outside of the battery case. The switch means is provided in a current flow path of the secondary battery.

In this arrangement, the pressure in the battery case is applied through the pressure introducing hole in the conductor case to the disk spring. If the pressure in the disk spring exceeds a permissible limit, the disk spring will bend back, so that the switch means changes over. The current flow path is thus cut off.

The safety device, which is for use in a secondary battery having a battery case with a hole and a generating unit airtightly housed in the battery case, comprises a sealing sheet provided on the battery case to close its hole and has its front side facing the inside of the battery case through the hole. A disk spring is provided on the backside of the sealing sheet and is adapted to bend backward under the inner pressure of the battery case which is applied to the disk spring through the sealing sheet. Also a switch means is provided on the backside of the disk spring and is adapted to change over when the disk spring bends backward. The switch means is provided in a current flow path of the secondary battery.

In this arrangement, the pressure in the battery case is applied through the sealing sheet to the disk spring. If the pressure in the battery case exceeds a permissible limit, the disk spring will bend backward, so that the switch spring changes over. The current flow path is thus cut off.

If the pressure in the battery case should keep rising after the current flow path has been cut off, the sealing sheet will rupture, allowing the gas in the battery case to be released. Explosion of the battery is thus prevented.

Preferably, the switch means comprises a pair of terminals arranged so that while the front side of the disk spring is convex toward the sealing sheet, the disk spring is kept in contact with both the terminals, and when the disk spring bends backward so that its backside is convexed, the disk spring separates from at least one of the terminals.

The safety device, which is for use in a secondary battery having a battery case with a hole and a generating unit airtightly housed in the battery case, comprises a sealing sheet provided on the battery case to close its hole and has a front side facing the inside of the battery case through the hole so that the sheet is convexed toward the outside of the battery case if the inner pressure of the battery case exceeds a predetermined level. A movable member is superposed on the backside of the sealing sheet and is adapted to be moved by the sealing sheet when the sealing sheet is convexed toward the outside of the battery case. Also, and a switch means is adapted to change over when the movable member is moved by the sealing sheet. The switch means being is provided in a current flow path of the secondary battery.

In this arrangement, the pressure in the battery case is applied through the sealing sheet and the movable member to the switch means. If this pressure exceeds a predetermined point, the switch means changes over, cutting off the current flow path.

The safety device, which is for use in a secondary battery having a battery case with a hole and a generating unit airtightly housed in the battery case, comprises a shrinkable bellows-shaped container closing a hole formed in the battery case and protruding into the battery case so as to shrink if the inner pressure of the battery case exceeds a predetermined level. A movable member is provided in the bellows-shaped container and is adapted to be moved by the container when the container shrinks. A disk spring is superposed on the movable member. The disk spring is normally convexed toward the inside of the battery case and is adapted to bend backward by being pushed by the movable member when the movable member is moved by the container. Also, a pair of terminals is arranged so that while the disk spring is convexed toward the inside of the battery case, the disk spring is kept in contact with both the terminals, and when the disk spring bends backward by being pushed by the movable member, the disk spring separates from at least one of the terminals. The disk spring and the terminals are provided in a current flow path of the secondary battery.

In this arrangement, the pressure in the battery case is applied through the bellows-shaped container and the movable member to the disk spring. If the disk spring bends back, it separates from at least one of the pair of terminals, disconnecting the terminals from each other. The current flow path is thus cut off.

The safety device may also comprise a pressure-responsive deforming means adapted to be deformed under the pressure in the battery case. A temperature-responsive deforming means is adapted to be deformed in response to its own temperature, and a switch means is provided in a current flow path of the secondary battery and is adapted to change over if at least one of the pressure-responsive deforming means and the temperature-responsive deforming means is deformed.

The switch means, provided in the current flow path of the secondary battery, changes over if at least one of the pressure-responsive deforming means and the temperature-responsive deforming means is deformed. Namely, if the pressure or temperature in the battery case exceeds a predetermined point, the switch means changes over, cutting off the current flow path.

The safety device may also comprise a pressure-responsive disk spring adapted to bend backward under the pressure in the battery case, a bimetallic, temperature-responsive perforated disk spring having a hole in the center and provided opposite to the pressure-responsive disk spring, a pressure-responsive movable member superposed on the pressure-responsive disk spring and inserted in a hole formed in the temperature-responsive perforated disk spring. The pressure-responsive movable member is moved by the pressure-responsive disk spring when the latter bends backward. A temperature-responsive movable member is superposed on the temperature-responsive perforated disk spring and is adapted be moved by the temperature-responsive disk spring when the latter bends backward. Also, a switch means is provided in a current flow path of the secondary battery and is adapted to change over if the pressure-responsive movable member or the temperature-responsive movable member is moved by the pressure-responsive disk spring or the temperature-responsive perforated disk spring.

In this arrangement, if the pressure in the secondary battery exceeds a predetermined point, the pressure-responsive disk spring bends back, moving the pressure-responsive movable member through the hole formed in the temperature-responsive perforated disk spring. Also, if the temperature rises to a predetermined point, the temperature-responsive disk spring bends back, moving the temperature-responsive movable member moves. In either case, that is, if either of the movable members is moved, the switch means changes over. Namely, if the pressure or temperature in the battery case rises to a predetermined point, the switch means opens, cutting off the current flow path.

The safety device may also comprise a pressure-responsive deforming means adapted to be deformed under the pressure in the battery case, a pressure-responsive switch means adapted to change over if the pressure-responsive deforming means is deformed, a temperature-responsive deforming means adapted to be deformed in response to its own temperature, and a temperature-responsive switch means adapted to change over if the temperature-responsive deforming means is deformed. The pressure-responsive switch means and the temperature-responsive deforming means are provided in series in a current flow path of the secondary battery.

In this arrangement, in which the pressure-responsive switch means and the temperature-responsive switch are connected in series in the current flow path of the secondary battery, if at least one of the pressure-responsive deforming means or the temperature-responsive deforming means is deformed in response to pressure or temperature rise in the battery case, the pressure-responsive switch means or the temperature-responsive switch means opens, cutting off the current flow path.

The safety device may also comprise a pressure-responsive deforming means adapted to be deformed under the pressure in the battery case, a temperature-responsive deforming means which is a conductor adapted to be deformed in response to its own temperature or when the pressure-responsive deforming means are deformed, and a terminal kept in contact with the temperature-responsive deforming means. The temperature-responsive deforming means and the terminal are provided in a current flow passage of the secondary battery and are adapted to separate from each other if the temperature-responsive deforming means is deformed.

If the temperature rises to a predetermined point or the pressure-responsive deforming means is deformed, the temperature-responsive deforming means deforms and separates from the terminal. Since the temperature-responsive deforming means and the terminal are provided in the current flow path, this path is cut off if the pressure or temperature in the battery case exceeds a predetermined point.

The safety device may also comprise a pressure- and temperature-responsive deforming means adapted to be deformed under the pressure in the battery case and in response to its own temperature, and a switch means provided in a current flow path of the secondary battery and adapted to change over if the pressure- and temperature-responsive deforming means is deformed.

In this arrangement, the pressure- and temperature-responsive deforming means deforms in response to pressure and temperature rises in the battery case. The switch means thus changes over, cutting off the current flow path.

The disk spring comprises a spring body formed with a hole, and a sheet closing the hole.

If this disk spring is used in a safety device for a secondary battery, it is positioned so that it bends back under the pressure in the secondary battery. Also, a normally closed switch is provided in the current flow path of this battery so that it is opened by the disk spring when it bends back. Further, a gas passage is provided so that the gas in the battery can be released through the hole in the disk spring and the gas passage. If gas is produced from the generating unit of the secondary battery due to overcharging and shortcircuiting and the gas pressure in the battery exceeds a predetermined point, the disk spring bends back, opening the switch. The current flow path of the secondary battery is thus cut off. If the pressure keeps going up even after the current flow path has been cut off, the sheet covering the disk spring will rupture, allowing the gas in the secondary gas to be released through the gas passage into the outer environment. The pressure in the secondary battery thus drops, so that it is possible to prevent explosion of the secondary battery.

The disk spring of the present invention serves both as a switch changeover means and a gas release means. Thus, by using this disk spring, it is possible to simplify the structure of the safety device.

The sheet closing the hole of the disk spring may be a metal foil. If a metal foil is used to close the hole of the disk spring, a synthetic resin layer is preferably interposed between the metal foil and the disk spring to prevent electrolytic corrosion therebetween.

The disk spring may be a bimetal. If such a bimetallic disk spring is used in a secondary battery, a normally closed switch is provided in the current flow path of the secondary battery so that it is opened when the disk spring bends back. If the generating unit in the secondary battery heats up due to overcharging or shortcircuiting, the disk spring will bend back due to the heat produced, thus opening the switch in the current flow path. If the generating unit of the secondary battery keeps producing heat even after cutting off the current flow path and as a result, the pressure in the secondary battery exceeds a predetermined point, the sheet covering the hole of the disk spring will rupture, releasing the gas in the battery. Thus, it is possible to prevent explosion of the secondary battery.

Other features and objects of the present invention will become apparent from the following description made with reference to the accompanying drawings, in which:

DETAILED DESCRIPTION OF THE PREFERRED EMBODIMENT

Figure 1:
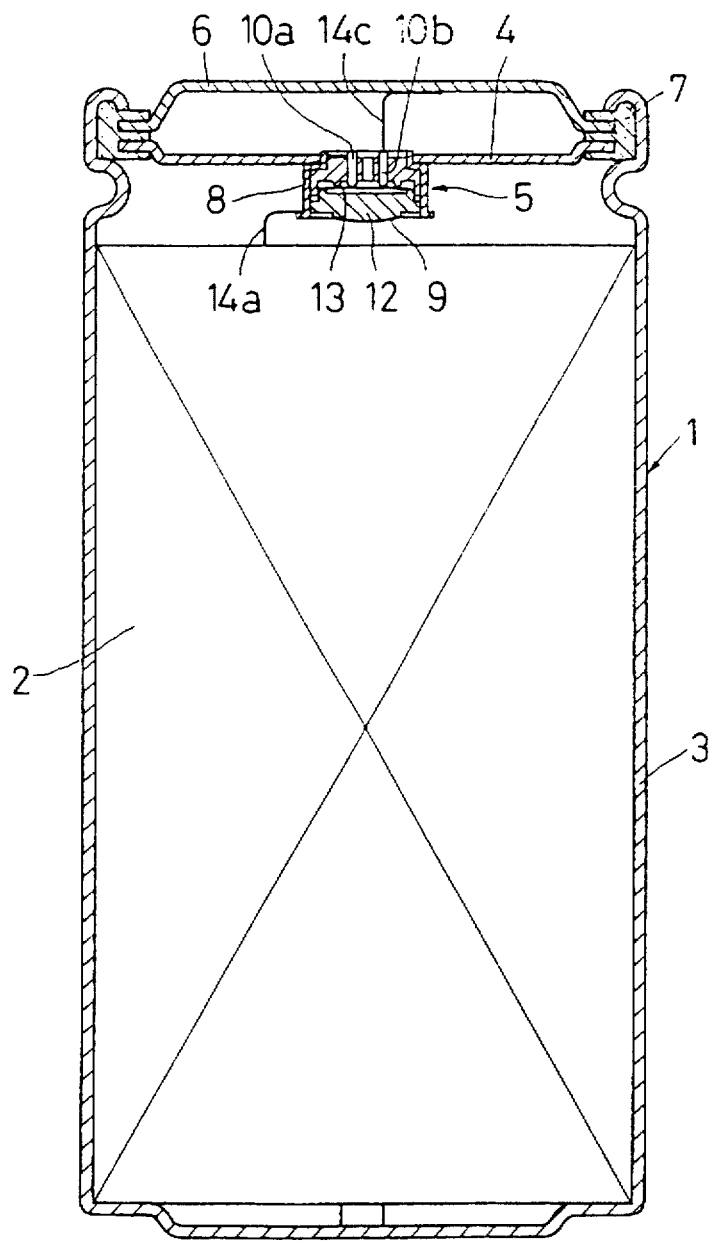
FIG. 1 is a sectional view of a secondary battery including a first embodiment of the safety device according to the present invention.

FIG. 1 shows a secondary battery in which is used a safety device of the first embodiment according to this invention. Namely, the secondary battery 1 has the safety device 5 mounted on an inner lid 4 of a battery case 3 in which is sealed a generating unit 2. The inner lid 4 and an electrode cover 6 are supported by caulking on the top end of the battery case 3 through an insulating member 7.

Figure 2:
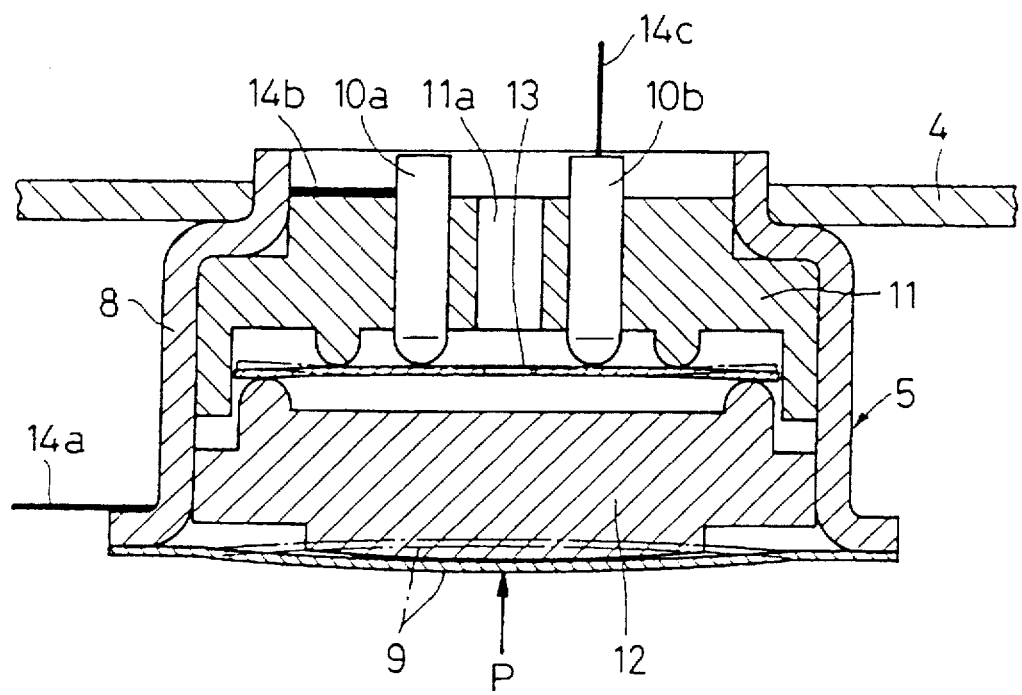
FIG. 2 is a sectional view of the safety device of FIG. 1.
Figure 3:
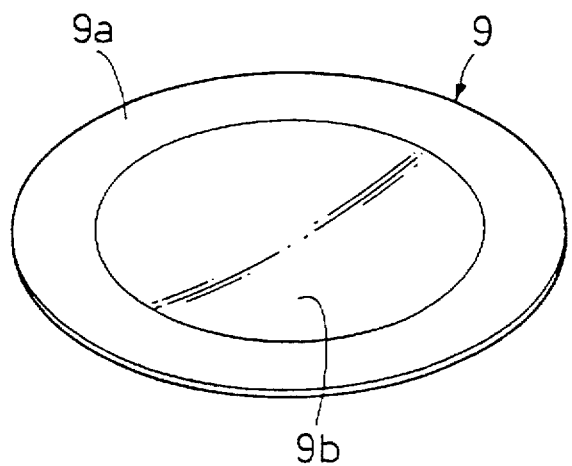
FIG. 3 is a perspective view of a disk spring in the safety device of FIG. 1.
Figure 4A:
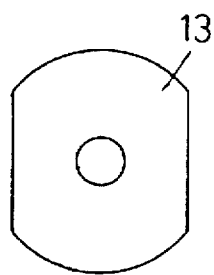
FIGS. 4A–4H are plan views of various examples of contacts used in the safety device of FIG. 1.
Figure 4B:
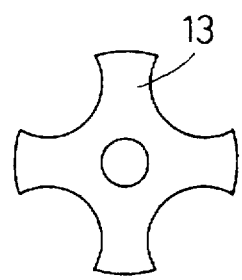
Figure 4C:
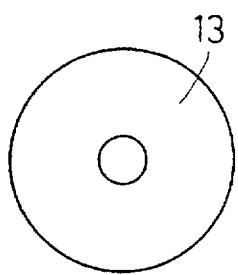
Figure 4D:
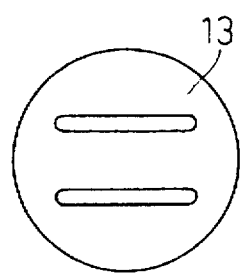
Figure 4E:
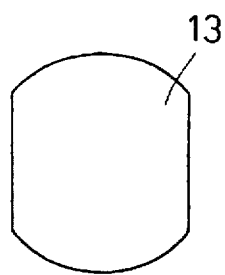
Figure 4F:
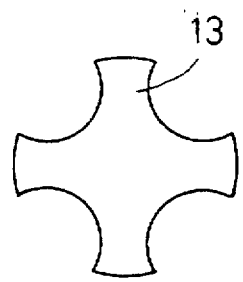
Figure 4G:
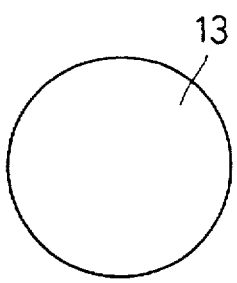
Figure 4H:
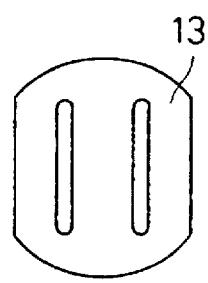

Referring to FIG. 2, the safety device 5 is mounted on the inner lid 4 by inserting its steel conductor case 8 in a hole formed in the inner ring and sealing the gap therebetween by welding or by means of a rubber seal. A disk spring 9 is fixed to the conductor case 8 near its bottom opening by welding its outer edge to the inner surface of the spring 9. As shown in FIG. 3, the disk spring 9 has an outer flat surface 9a and an inner spherical surface 9b. If a predetermined pressure P (upper permissible pressure in the battery case 3) is applied to the bottom surface of the disk spring 9, it is instantly pushed in from the initial position shown by solid line in FIG. 2 to the position shown by chain line.

The generating unit 2 has its positive electrode connected to the conductor case 8 through a lead 14a and to a terminal 10a through a lead 14b. Another terminal 10b is connected through a lead 14c to the electrode cover 6. Thus, the positive electrode of the generating unit 2 is normally connected to the electrode cover 6 via lead 14a conductor case 8→lead 14b→terminal 10a→contact 13→terminal 10b→lead 14c.

If the secondary battery 1 is overcharged or shortcircuits, the generating unit 2 will produce gas, which will increase the pressure in the battery case 3. The pressure in the battery case 3 acts on the disk spring 9. If this pressure exceeds the permissible level, the disk spring 9 will yield and bend backward, while pushing up a movable member 12, thereby deflecting the contact 13 as shown by chain line in FIG. 2. The contact 13 now separates from both terminals 10a and 10, disconnecting them from each other. The safety device thus prevents overcharging or shortcircuiting of the battery. Since the generating unit 2 is deactivated, it is possible to prevent any further pressure rise in the case 3.

Checkups of the safety device 5 are carried out as follows. First, a pressure is applied to the underside of the disk spring 9 to let it bend back. Confirmation is made that the terminals 10a and 10b have been disconnected from each other. Pressurized air is then supplied into a hole 11a in the base 11 to push the disk spring 9 back to its original position. Confirmation is made that the terminals 10a and 10b have been connected together again. Such checkups can be done without breaking down the safety device 5.

The contact 13 may have one of the shapes shown in FIGS. 4A to 4H or any other shape.

Figure 5A:
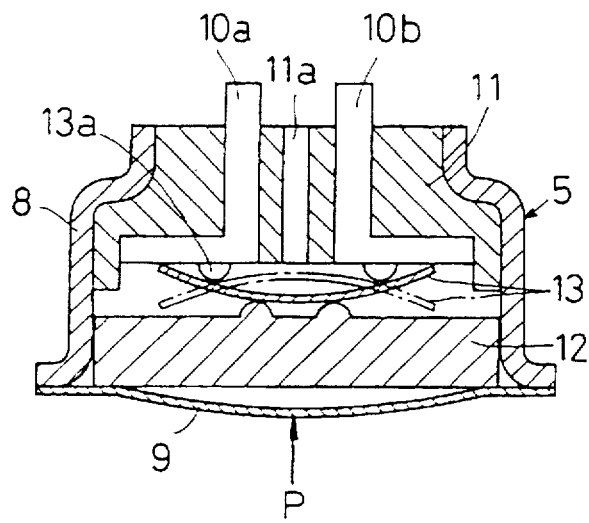
FIGS. 5A–5C are sectional views of alternate embodiments of the safety device of FIG. 1.
Figure 5B:
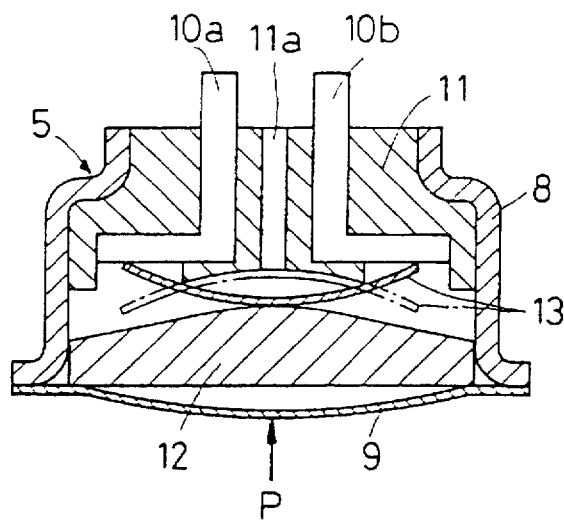
Figure 5C:
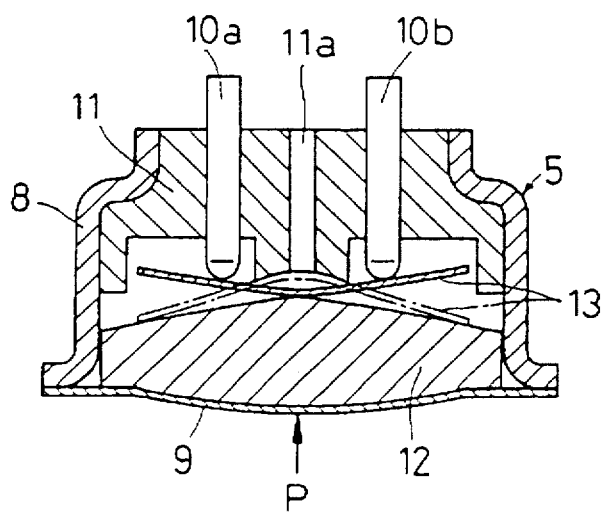

FIGS. 5A to 5C show alternative embodiments of the safety device 5 shown in FIG. 2. In any of these alternative embodiments, when the disk spring 9 bends backward under the pressure in the battery case 3, the movable member 12 is pushed up to separate the contact 13 from both terminals 10a, 10b, thus disconnecting them from each other. By supplying pressurized air into the hole 11a of the base 11, the disk spring 9 is pushed back to its original position, so that the terminals 10a and 10b are reconnected together.

Figure 6:
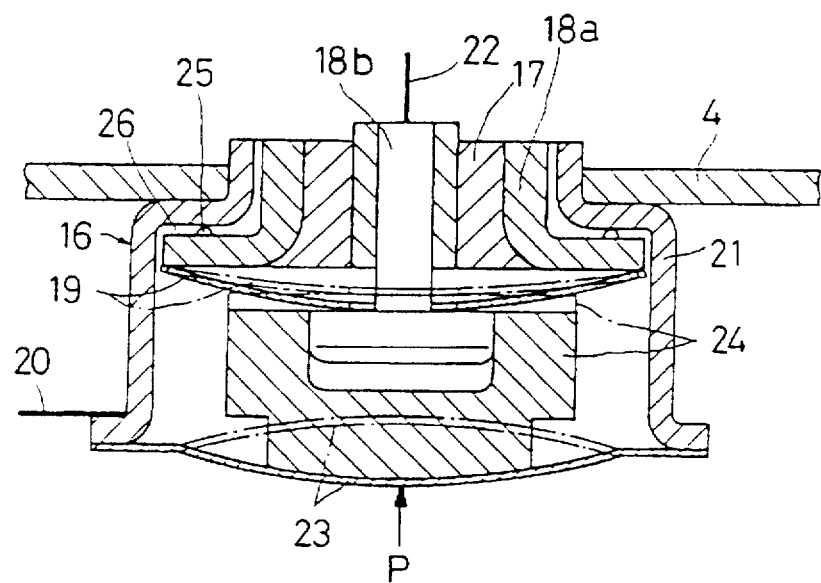
FIG. 6 is a sectional view of a second embodiment of the safety device according to the present invention.

FIG. 6 shows the second embodiment of the safety device according to this invention. The safety device 16 of this embodiment is mounted on the inner lid 4 of the secondary battery 1 as with the safety device 5 shown in FIG. 1.

This safety device 16 has its terminals 18a and 18b supported on a resin or glass sleeve 17 disposed therebetween. The terminal 18a is in contact with the contact 19 near its outer edge. The terminal 18b extends through a center hole formed in the contact 19 and has its head in contact with the center of the contact 19.

The positive electrode of the generating unit 2 is connected to the electrode cover 6 through lead 20→conductor case 21→terminal 18a→contact 19→terminal 18b→lead 22.

When the disk spring 23 bends backward under the pressure in the battery case 3, it pushes up the movable member 24, which in turn pushes up the center of the contact 19, thus separating the contact from the terminal 18b. The terminals 18a and 18b are thus disconnected from each other.

The terminal 18a has a plurality of protrusions 25 provided along its outer edge and disposed between the terminal 18a and the conductor case 21 to define an air passage 26 therebetween.

By supplying pressurized air through this air passage 26 into the conductor case 21, the pressure in the conductor case 21 increases, so that the disk spring 23 can be pushed back to its original position.

Figure 7:
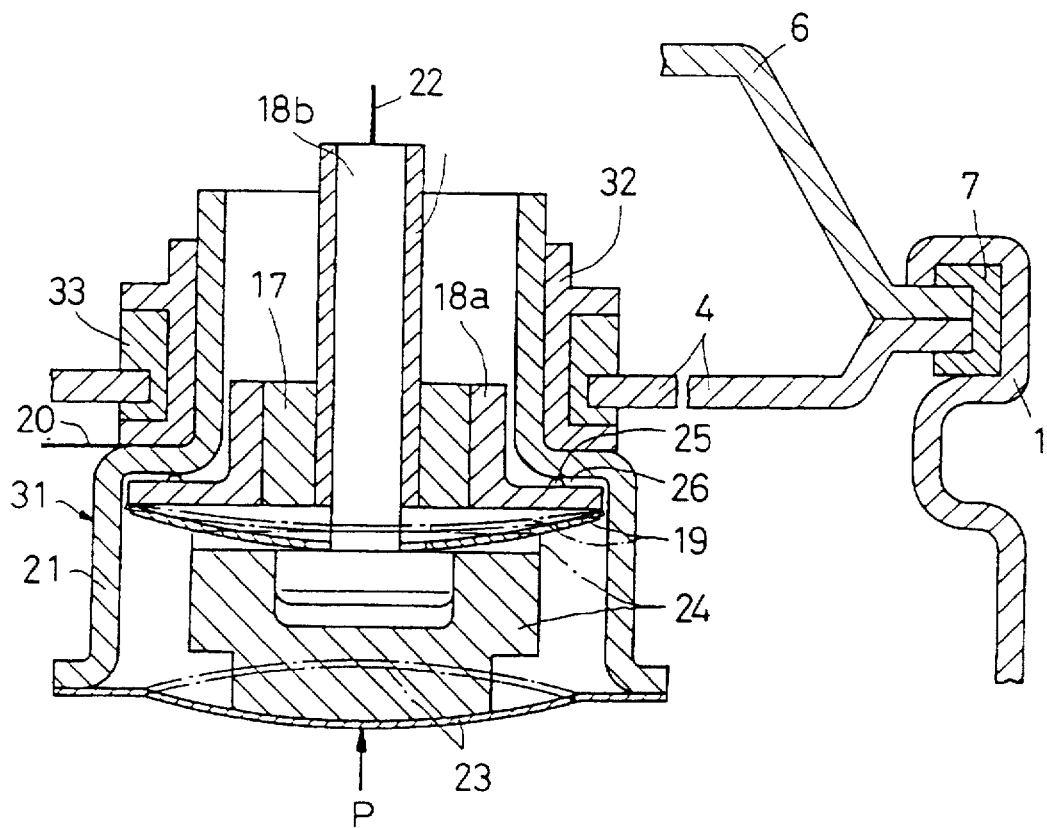
FIG. 7 is a sectional view of a third embodiment of the safety device according to the present invention.

FIG. 7 shows the third embodiment of the safety device according to this invention. This safety device 31 has the same conductor case 21 shown in FIG. 6. A connector ring 32 is fixed to the outer periphery of the conductor case 21 and airtightly mounted on the inner lid 4 through an adhesive 33. The adhesive 33, being an insulating material, makes it unnecessary to insulate the inner lid 4 and the electrode cover 6 from each other. Thus, it is possible to support the inner lid 4 and the electrode cover 6 by abutting and caulking their outer edges.

As in the first and second embodiments, if the pressure in the battery case 3 exceeds the permissible level, the disk spring 23 bends backward, disconnecting the terminals 18a and 18b from each other. By supplying pressurized air into the conductor case 21 through the air passage 26, the disk spring 23 is pushed back to its original position.

The inner lid 4 of any of the first to third embodiments may have a thin-walled portion as disclosed in Unexamined Japanese Patent Publication 2-288063. If the pressure in the battery case 3 keeps rising even after the terminals have been disconnected, such a thin-walled portion will rupture, releasing the pressure in the battery case 3. Thus, by providing such a thin-walled portion, it is possible to improve the safety of the battery still further.

Figure 8:
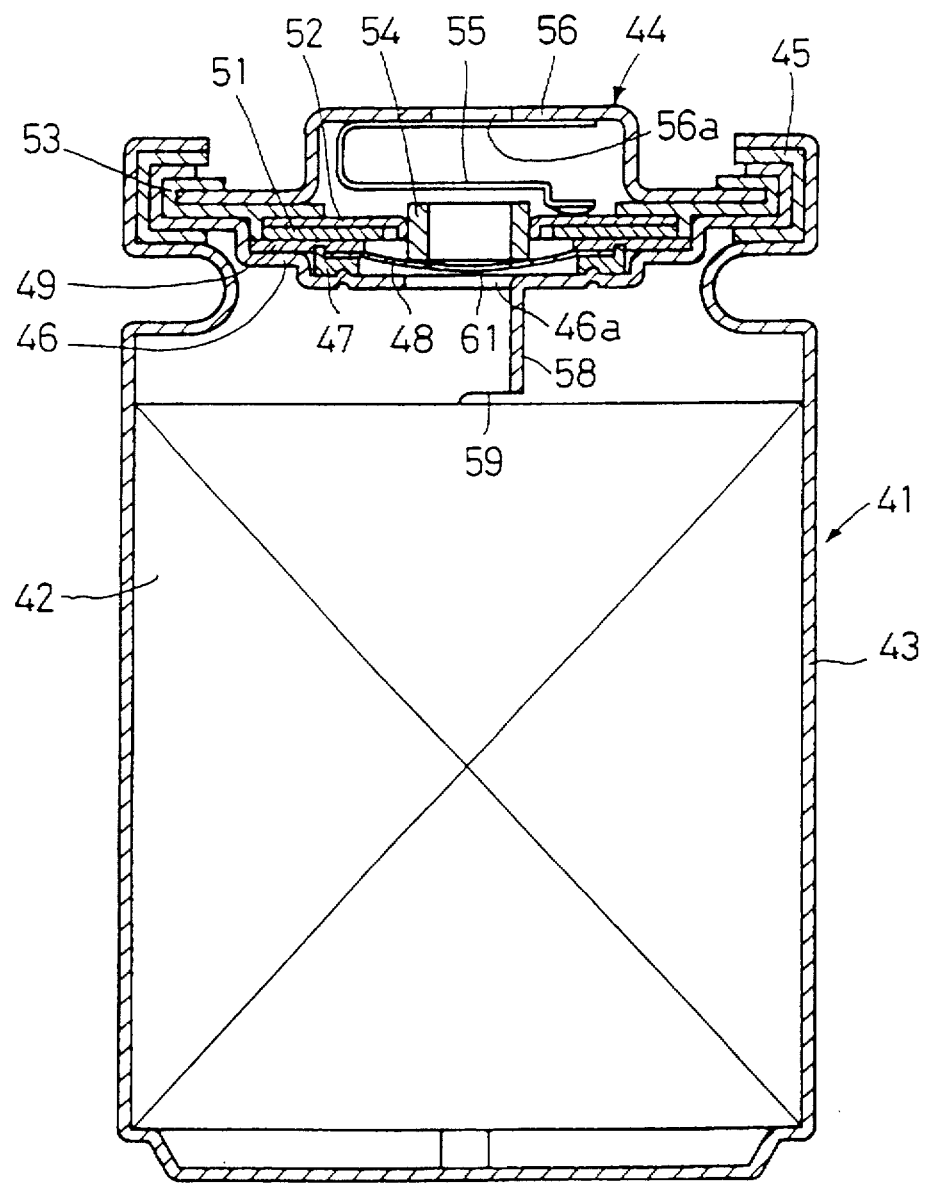
FIG. 8 is a sectional view of a secondary battery including a fourth embodiment of the safety device according to the present invention.

FIG. 8 shows a secondary battery having a safety device of the fourth embodiment according to this invention. This secondary battery 41 has the safety device 44 mounted on the top end of a cylindrical battery case 43 in which is sealed a generating unit 42. The safety device 44 is supported by caulking through an insulating member 45.

The safety device 44 has a gasket 47, a disk spring 48, a presser plate 49, a PTC plate, an annular terminal 52 and an insulating seal 53 that are superposed one on another and mounted in a conductor case 46. A cylindrical movable member 54 is inserted in a center hole in the annular terminal 52. An electrode cover 56 carrying a resistance-welded contact 55 encloses these members. The conductor case 46 has its outer edge caulked to engage the outer edge of the electrode cover 56.

The conductor case 46 has a hole 46a in its bottom so that the pressure in the battery case of the secondary battery 41 acts on the disk spring 48. A lead terminal 58 hangs down from the edge of the hole 46a in the conductor case 46. This lead terminal 58 is connected to the electrode of the generating unit 42 through a lead 59.

Figure 9:
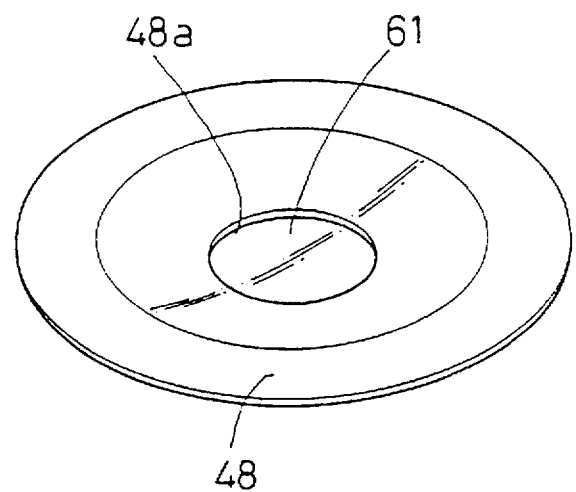
FIG. 9 is a perspective view of a disk spring used in the safety device of FIG. 8.

The disk spring 48 is the first embodiment of the disk spring according to this invention. As shown in FIG. 9, it has a hole 48a in the center and is covered with an aluminum foil 61 that closes the hole 48a. The presser plate 49 overlying the disk spring 48 has its outer edge fixed by ultrasonic welding to the conductor case 46.

The PTC plate 51 is a member whose resistivity remains low at room temperature but increases abruptly when the ambient temperature exceeds a predetermined point. It is provided to improve safety. We will later detail this feature.

The contact 55 is made of a sufficiently elastic material. Its tip is kept in contact with the annular terminal 52.

Electricity flows in the safety device 44 through: lead 59→lead terminal 58 of the conductor case 46→presser plate 49→PTC plate 51→annular terminal 52→contact 55→electrode cover 56. Namely, the contact 55 electrically connects the annular terminal 52 and the electrode cover 56 together.

If an excess current flows in the battery due to overcharging or shortcircuiting, the PTC plate 51 will heat up to a temperature higher than the above predetermined point, resulting in a sharp increase in its resistivity. The excess current thus subsides, so that overcharging or shortcircuiting can be avoided.

Figure 10:
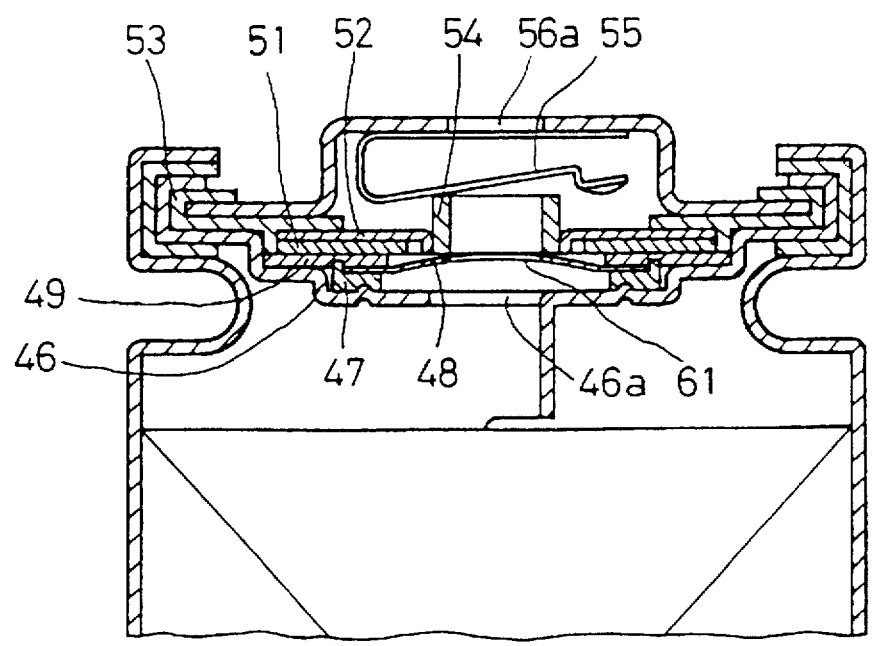
FIG. 10 is a view showing an operational state of the safety device of FIG. 8.
Figure 11:
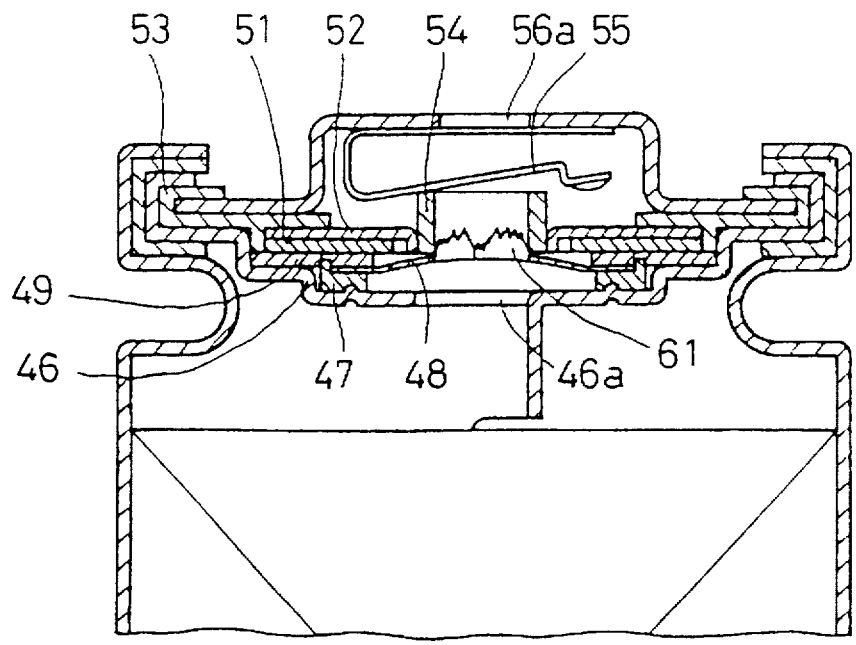
FIG. 11 is a view showing another operational state of the safety device of FIG. 8.

If the pressure in the battery case 43 exceeds the permissible limit even though an excess current is being suppressed by the PCT plate 51, the disk spring 48 will be bent backward under the pressure in the battery case so that its back side is convex as shown in FIG. 10. The movable member 54 is thus pushed up. The ascending movable member 54 pushes up the contact 55, separating its tip from the annular terminal 52. The annular terminal 52 is thus disconnected from and the electrode cover 56. The flow of current through the battery is thus cut off.

If the pressure in the battery case 43 still refuses to stop climbing in this state, the aluminum foil 61 covering the surface of the disk spring 48 will rupture, allowing the gas filling the battery case 43 to be released through the hole 48a in the disk spring 48 and the center hole in the cylindrical movable member 54 into the interior of the electrode cover 56 and then into the outer environment.

Thus, the safety device 44 has triple safety means against explosion of the secondary battery 41, i.e. the PTC plate 51 for suppressing excess current, the disk spring 48 for cutting off the supply of electricity by bending backward, and the aluminum foil 61 adapted to release inner gas by rupturing.

A checkup of the safety device 44 is carried out before mounting it on the battery case 43 in the following manner.

First, judgment is made if the electrode cover 56 and the lead terminal 58 are electrically connected together. If negative, the device is defective.

Then, air is supplied under pressure into the conductor case 46 of the safety device 44 through its hole 46a to bend the disk spring 48 under the pressure of the compressed air so that its backside is convexed. If, in this state, the electrode cover 56 and the lead terminal 58 are still electrically connected together, the device is judged to be defective.

With the disk spring bent backward, a small-diameter rod (not shown) is inserted into the electrode cover 56 through its hole 56a to push down the cylindrical movable member 54 until the disk spring 48 is bent again, i.e. its front side is convexed again. If, in this state, the electrode cover 56 and the lead terminal 58 are electrically connected together again, the safety device 44 is judged non-defective.

Instead of the aluminum foil 61, a non-aluminum metal foil or any kind of synthetic resin film may be used.

Instead of the disk spring 48 formed with the hole 48a covered with the aluminum foil 61, use may be made of a disk spring having a central thin portion adapted to be ruptured under a predetermined pressure. To check such a disk spring, instead of pushing down the cylindrical movable member 54 with a small-diameter rod, air is supplied under pressure into the electrode cover 56 through its hole 56a to bend the disk spring.

Figure 12:
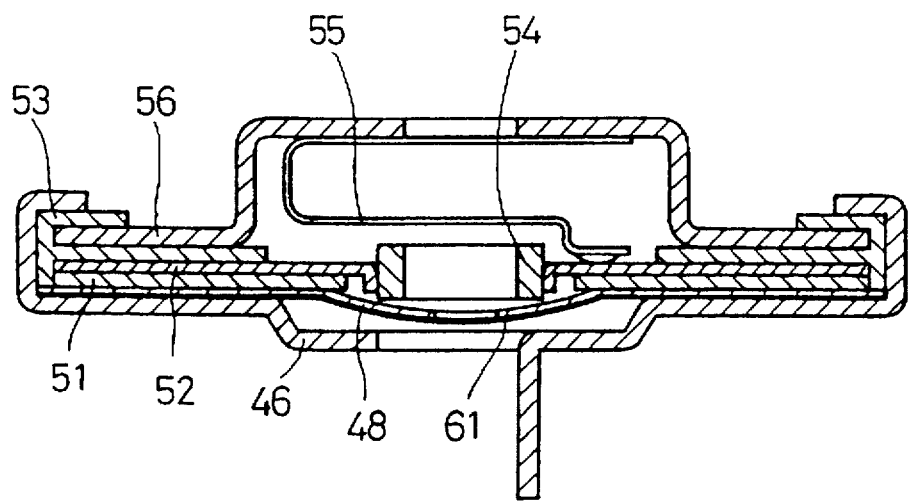
FIG. 12 is a view of an alternate embodiment of the safety device of FIG. 8.

FIG. 12 shows an alternate embodiment of the safety device of FIG. 8. Here, the gasket 47 and the presser plate 49 are not used. Instead, the conductor case 46 and the disk spring 48 are welded together to provide an airtight seal therebetween.

Figure 13:
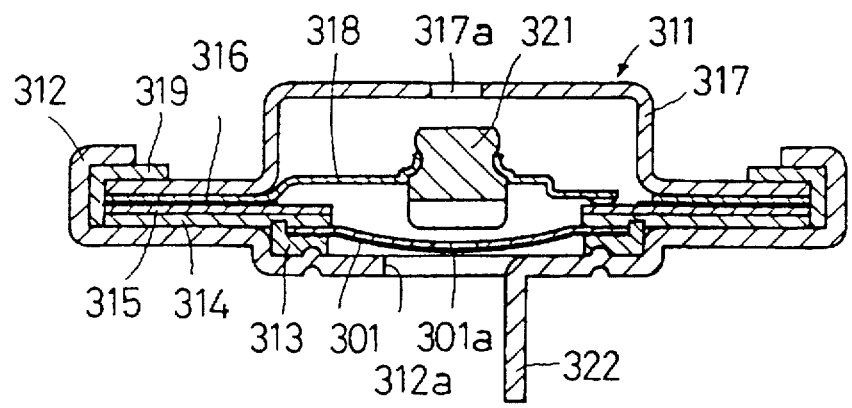
FIG. 13 is a sectional view of another alternate embodiment of the safety device of FIG. 8.

FIG. 13 shows another embodiment of the safety device of FIG. 8. The safety device 311 of this embodiment has a gasket 313, a disk spring 301, a PTC plate 314, an annular terminal 315 and an insulating seal 316 that are superposed one on another and mounted in a conductor case 312. A contact 318 has its outer edge sandwiched between the underlying insulating seal 316 and an electrode cover 317. The conductor case 319 has its outer edge caulked to engage the outer edge of the electrode cover 317 through an insulating member 320.

Figure 14:
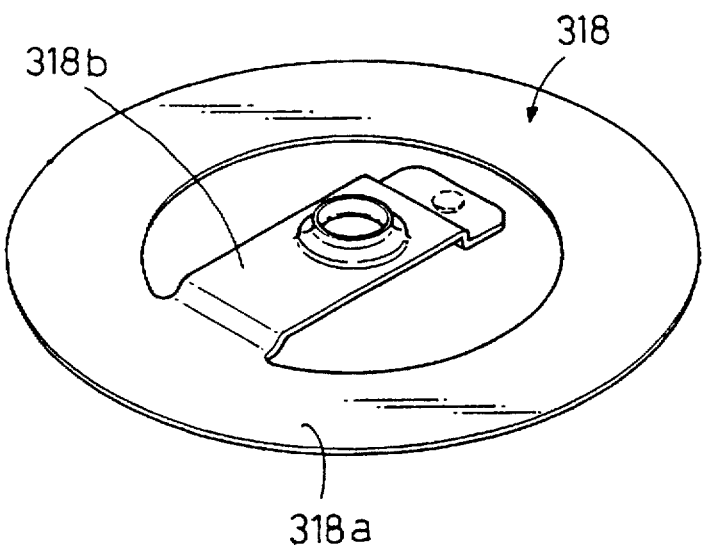
FIG. 14 is a perspective view of a contact used in the safety device of FIG. 13.
Figure 15:
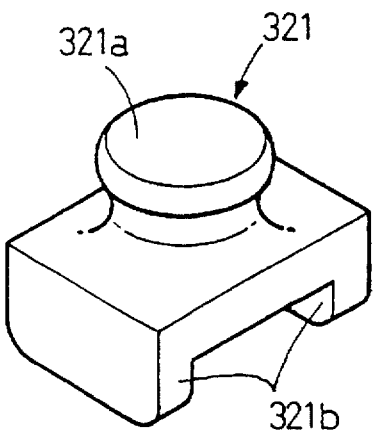
FIG. 15 is a perspective view of a pusher used in the safety device of FIG. 13.

As shown in FIG. 14, the contact 318 of the electrode cover 317 comprises an annular portion 318a interposed between the insulating seal 316 and the electrode cover 317, and a tongue 318b kept in contact with the annular terminal 315. The tongue 318b has a hole in which is press-fitted a spring pusher 321. As shown in FIG. 15, the spring pusher 321 comprises a head 321a and two legs 321b, the space therebetween being wider than the diameter of a hole 301a formed in the disk spring 301.

If an excess current should flow in the secondary battery that carries this safety device 311 due to overcharging or shortcircuiting, the PTC plate 314 will heat up due to the excess current, so that its resistivity increases sharply. Overcharging or shortcircuiting is thus avoided.

Figure 16:
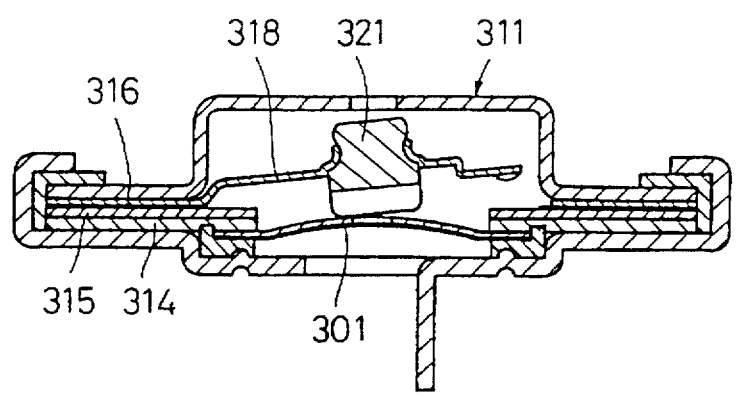
FIG. 16 is a view showing an operational state of the safety device of FIG. 13.
Figure 17:
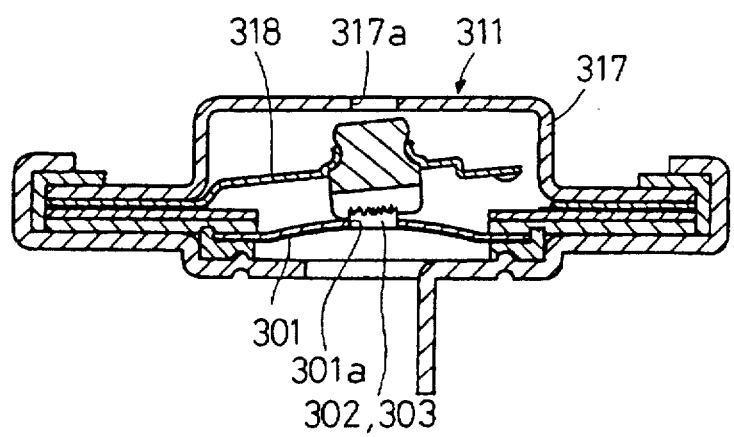
FIG. 17 is a view showing another operational state of the safety device of FIG. 13.

If the pressure and temperature in the battery case keep rising even after the excess current has been attenuated, the disk spring 301 will bend backward as shown in FIG. 16 when the above pressure or temperature has risen to a given point. The disk spring 301 thus pushes up the legs 321b of the spring pusher 321, separating the tip of the contact 318 from the annular terminal 315. Current-carrying path is thus cut off.

If the pressure and temperature in the battery case still keep rising thereafter, the synthetic resin film 302 and the aluminum foil 303 covering the disk spring 301 will rupture, allowing the gas in the battery case to be released into the outer environment through the center hole 301a of the disk spring 301 and the hole 317a in the electrode cover 317. It is thus possible to prevent explosion of the battery case.

Thus, the safety device of this embodiment has triple safety means against explosion of the secondary battery, i.e. the PTC plate for suppressing excess current, the disk spring 301 for cutting off the supply of electricity by bending backward if the pressure or temperature has rises to a given point, and the synthetic resin film or aluminum foil or adapted to release inner gas by rupturing.

Figure 18:
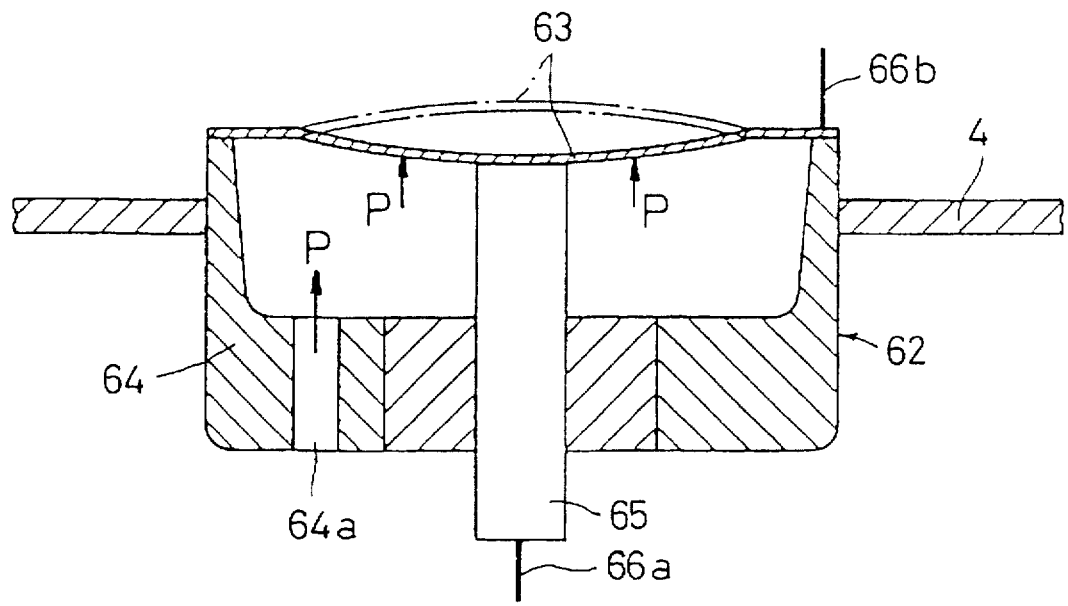
FIG. 18 is a sectional view of a fifth embodiment of the safety device according to the present invention.

FIG. 18 shows the fifth embodiment of the safety device according to this invention. This safety device 62 is used in the secondary battery shown in FIG. 1. In this embodiment, the disk spring 63 is used as a contact. If the disk spring 63 bends backward under the pressure produced by the generating unit and applied through a pressure introducing hole 64a to the disk spring 63, the disk spring 63 separates from a terminal 65. No current flows through the battery in this state.

In this embodiment, a lead 66b extends from the outer edge of the disk spring 63 to the electrode cover 6 shown in FIG. 1. But the disk spring 63 and the electrode cover 6 may be electrically connected together by forming the case 64 and the inner lid 4 from a conductive material and caulking the outer edge of the electrode cover 6.

In the fifth embodiment, as with the other embodiments, by pushing the disk spring 63 from its back, it bends back to its original position. To further reduce the possibility of explosion, a weak portion may be provided in the center of the disk spring 63 so that it can easily rupture at this weak portion.

Figure 19:
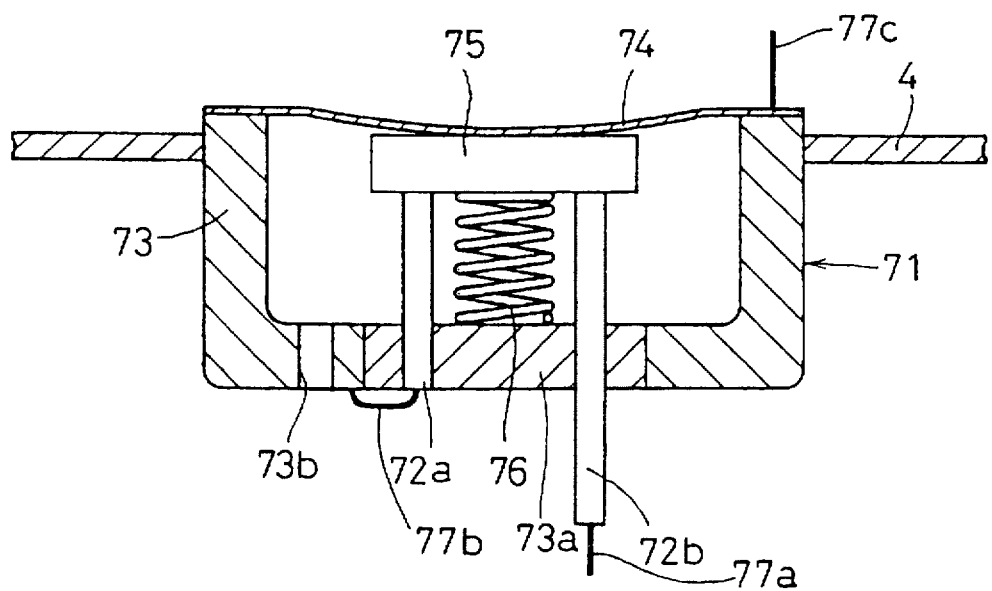
FIG. 19 is a sectional view of a sixth embodiment of the safety device according to the present invention.

FIG. 19 shows the sixth embodiment of the safety device according to this invention. The safety device 71 comprises a case 73 having an insulated portion 73a, two terminals 72a and 72b extending through the insulated portion 73a into the case 73, a disk spring 74, a conductive member 75 disposed between the terminals 72a, 72b and the disk spring 74, and a coil spring 76 biasing the conductive member 75 upward. The terminals 72a and 72b are electrically connected together via the conductive member 75. Leads 77a–77c are connected to these members, forming an electric circuit.

If the disk spring 74 bends backward under the pressure in the battery case 3 which is applied through a hole 73b in the case 73 to the disk spring 74, the conductive member 75 separates from the terminals 72a and 72b by being pushed up by the coil spring 76. The terminals 72a and 72b are thus electrically disconnected from each other.

Figure 20:
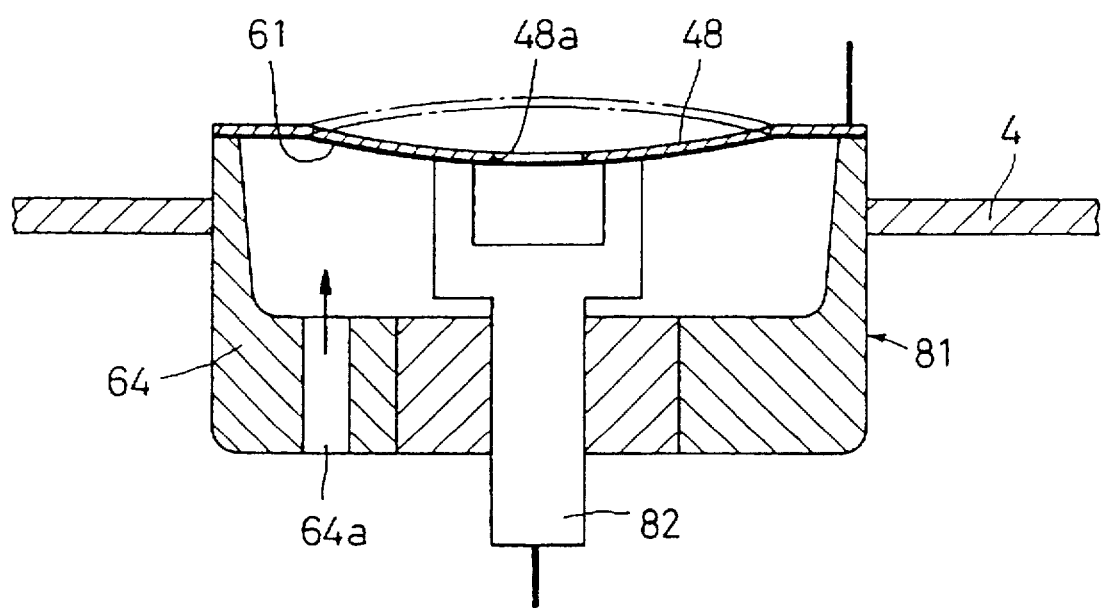
FIG. 20 is a sectional view of a seventh embodiment of the safety device according to the present invention.

FIG. 20 shows the seventh embodiment of the safety device according to this invention. In this safety device 81, the disk spring 48 shown in FIG. 9 is used. Its terminal 82 has a cylindrical top end kept in contact with the disk spring 48.

If the disk spring 48 bends backward under the pressure in the battery case 3 which is applied through a hole 64a formed in the case 64 to the disk spring 48, the terminal 82 is electrically disconnected from the disk spring 48. If the pressure in the battery case is still rising in this state, the aluminum foil 61 will eventually rupture. The gas in the case is thus released through a hole 48a in the disk spring 48.

Figure 21:
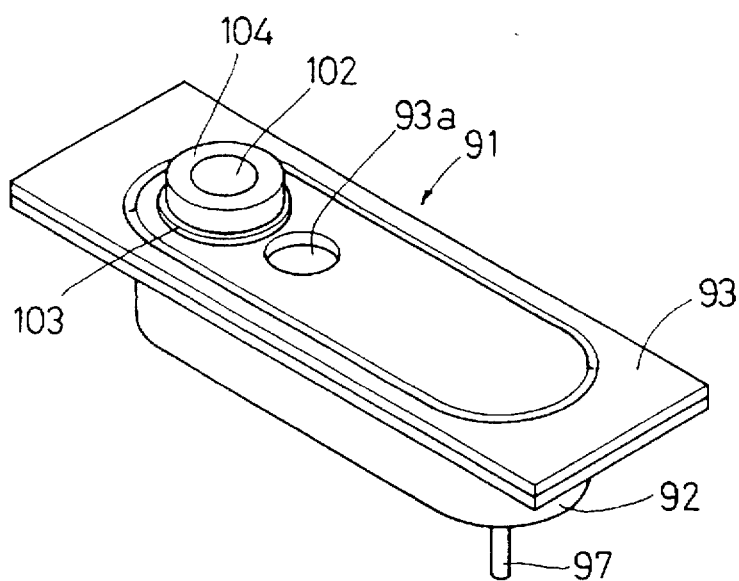
FIG. 21 is a perspective view of an eighth embodiment of the safety device according to the present invention.
Figure 22:
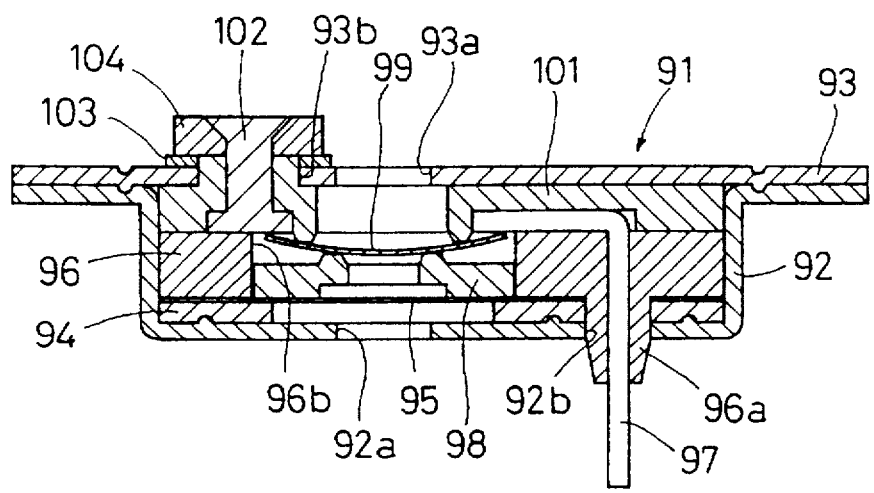
FIG. 22 is a sectional view of the safety device of FIG. 21.

FIGS. 21 and 22 show the eighth embodiment of the safety device of this invention, of which FIG. 21 shows its exterior and FIG. 22 its inner structure.

The housing of this safety device 91 comprises a metal case 92 and cover 93 which are joined together by resistance welding. In the bottom of the case 92, a pressure hole 92a and a terminal passage 92b are formed. In the cover 93, an exhaust hole 93a and a terminal passage 93b are formed.

A rubber packing 94 is laid on the bottom of the case 92. An aluminum foil 95 and a base 96 are superposed on the rubber packing 94. A first terminal 97 extends through a protrusion 96a of the base 96 and is rigidly fastened to the base 96. The first terminal 97 is bent at a right angle at its top so as to be in close contact with the top surface of the base 96.

The protrusion 96a of the base 96 extends through the rubber packing 94 and the case 92 and protrudes downwardly from the case 92. The first terminal 97 also protrudes downwardly from the case 92.

Figure 23:
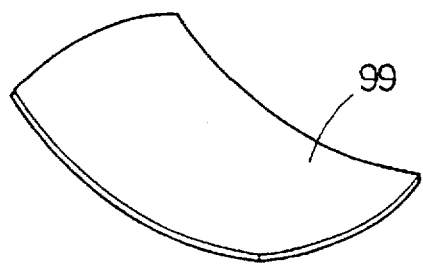
FIG. 23 is a perspective view of a disk spring used in the safety device of FIG. 21.

A movable member 98 is received in a bore 96b formed in the base 96. A disk spring 99 is placed on the movable member 98. The disk spring 99 is an oval member as shown in FIG. 23. Normally, the disk spring 99 is convex on the side facing an aluminum foil 95.

An insulating plate 101 is placed on the base 96 and the disk spring 99. A second terminal 102 extends through the lefthand part of the insulating plate 101 and protrudes upwardly from the cover 93. An insulating ring 103 and a conductor ring 104 is fitted around the second terminal 102. By squashing the top of the second terminal 102, the insulating ring 103 and the conductor ring 104 are fixed in position.

In the state shown in FIG. 22, the disk spring 99 is in contact at its both ends with the first terminal 97 and the second terminal 102. A current flows through first terminal 97, disk spring 99, and second terminal 102.

Figure 24:
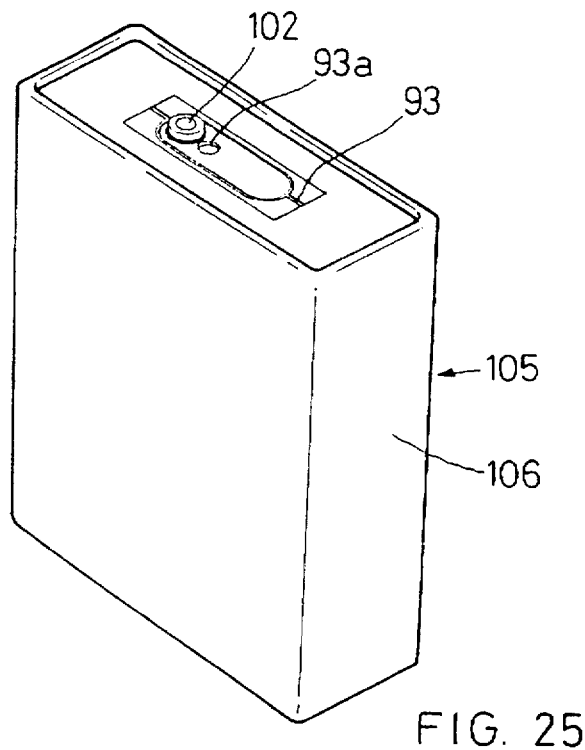
FIG. 24 is a perspective view of a secondary battery equipped with the safety device of FIG. 21.
Figure 25:
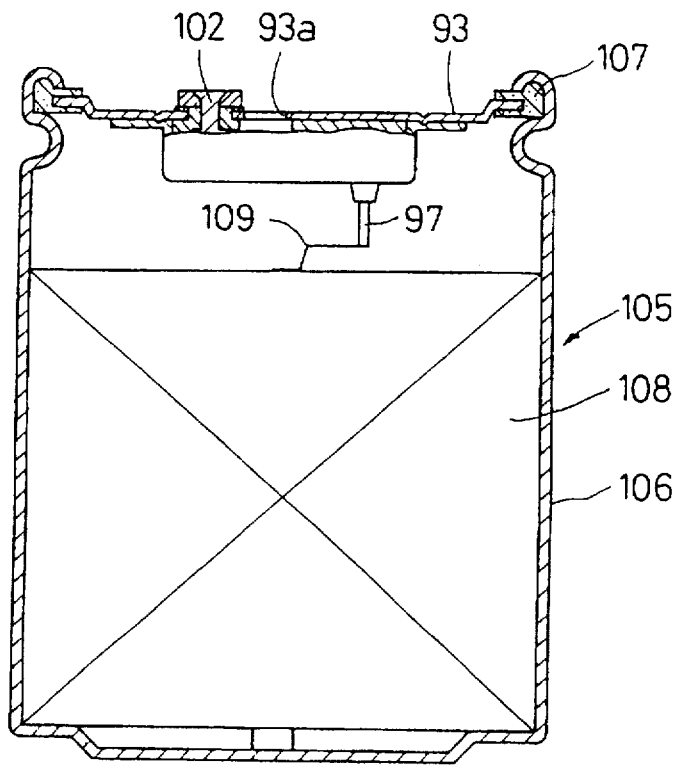
FIG. 25 is a sectional view of the secondary battery of FIG. 24.

The safety device 91 of this embodiment is mounted in a secondary battery 105 shown in FIGS. 24 and 25. The cover 93 shown in FIG. 22 is used as the lid of this secondary battery 105. An insulating annular packing 107 circles the inner periphery of the battery case 106 of the secondary battery 105 near its top. A lid 93 is fitted in the insulating annular packing 107. The battery case 106 is caulked along its top edge to fix the lid 93 in position by engaging its outer edge. The generating unit 108 is thus airtightly sealed in the battery case 106.

The first terminal 97 of the case 92 is connected to one of the electrodes of the generating unit 108 through a wire 109. Thus, this electrode is electrically connected to an outside power source through wire 109→first terminal 97→disk spring 99→second terminal 102. The other electrode of the generating unit 108 is connected to the battery case 106.

Figure 26:
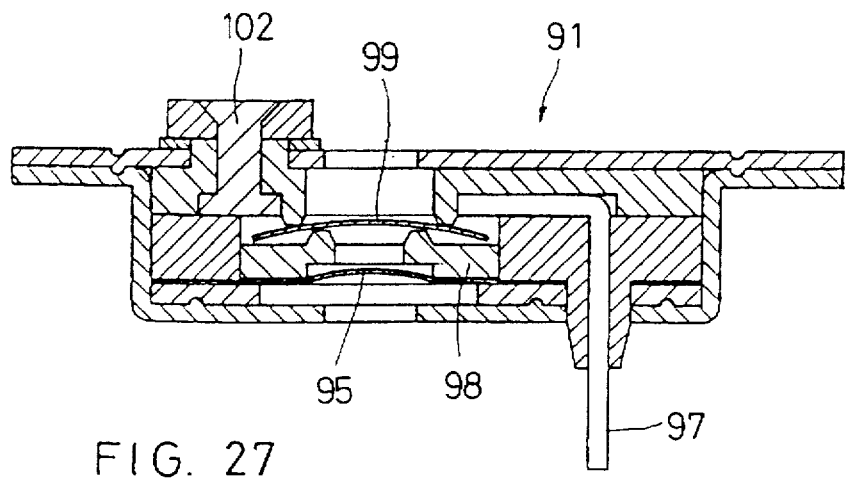
FIG. 26 is a view showing an operational state of the safety device of FIG. 21.

If an excess current flow in the secondary battery 105 due to overcharging or shortcircuiting, the pressure in the battery case 106 will increase due to gas produced from the generating unit 108. The aluminum foil 95 is thus raised under the pressure in the battery case 106, together with the movable member 98. The pressure in the battery case is thus applied through the movable member 98 to the disk spring 99. Thus, if the pressure in the battery case exceeds a predetermined level, the disk spring 99 will bend backward so that its backside is convexed as shown in FIG. 26. In this state, since the first and second terminals 97 and 102 are separate from both ends of the disk spring 99, no current flows through the battery. The generating unit thus stops producing gas, so that the inner pressure will not increase any further.

Figure 27:
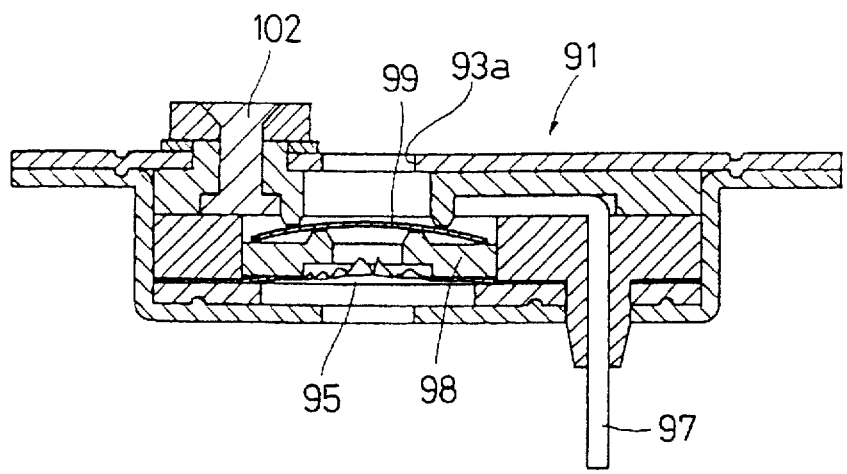
FIG. 27 is a view showing another operational state of the safety device of FIG. 21.

If the pressure in the battery case 106 is still rising in spite of the fact that a current is not flowing, the aluminum foil 95 will rupture as shown in FIG. 27. The gas in the battery case 106 thus flows upwardly through a hole in the aluminum foil 95 and then through a center hole formed in the movable member 98→a space around the disk spring 99→exhaust hole 93a of the lid 93, and released into the outer environment. It is thus possible to prevent explosion of the battery case 106.

Namely, the safety device of this embodiment has double safety means against explosion of the secondary battery 105, i.e. the disk spring 99 for cutting off the supply of electricity by bending backward, and the aluminum foil 95 adapted to release inner gas by rupturing.

A checkup of the safety device 91 is carried out before mounting it in the secondary battery 105 in the following manner.

First, judgment is made if the first and second terminals 97 and 102 are electrically connected together. If negative, the device is defective.

Then, air is supplied under pressure into the case 92 of the safety device 91 through its pressure hole 92a to bend the disk spring 99 under the pressure of the compressed air so that its backside is convexed. If, in this state, the first and second terminals 97 and 102 are still electrically connected together, the device is judged to be defective.

After this test, the air pressure is removed and the disk spring 99 is pushed from its back by accessing the spring 99 through the exhaust hole 93a in the lid 93 until the disk spring 48 is bent again. i.e. its front side is convexed again. If, in this state, the first and second terminals 97 and 102 are electrically connected together again, the safety device 91 is judged non-defective.

In this test, air pressure has to be increased until the disk spring 99 bends backward. But care must be taken not to increase the air pressure until the aluminum foil 95 ruptures. The disk spring 99 may be pushed back e.g. by inserting a thin rod through the exhaust hole 93a in the lid 93.

Instead of the aluminum foil, a thin synthetic resin sheet may be used.

Figure 28:
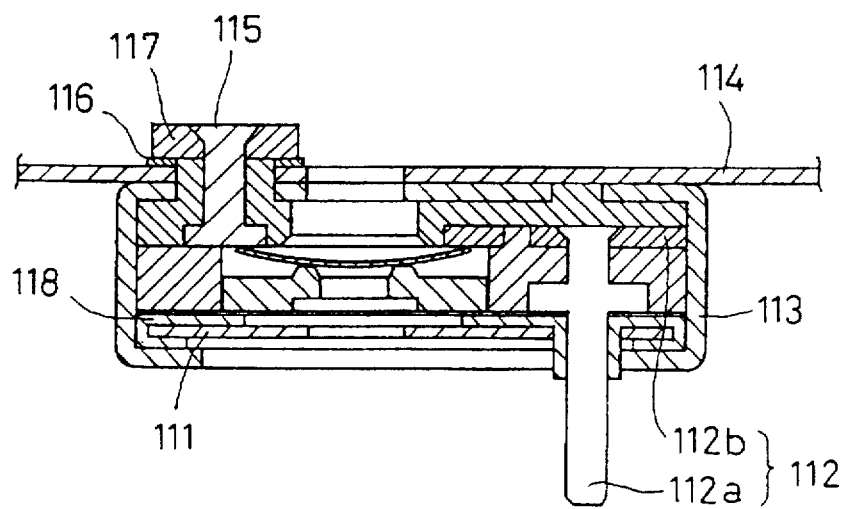
FIG. 28 is a sectional view of a ninth embodiment of the safety device according to the present invention.

FIG. 28 shows the ninth embodiment of the safety device according to this invention. Here, the first terminal 112 comprises a rod member 112a and a plate member 112b. They are coupled together by inserting the top portion of the rod member 112a into a hole in the plate member 112b and squashing the top end of the rod member 12a. The case 113 is caulked along its bottom edge to sandwich the members mounted in the case 113 between the bottom edge of the case 113 and its top wall. An airtight seal is provided by a rubber packing 118 and a spacer 111 disposed along the bottom edge of the case 113.

The case 113 and the lid 114 are coupled together through a second terminal 115 and by resistance welding. The second terminal 115 extends through the case 113 and the lid 114. An insulating ring 116 and a conductor ring 117 are fitted around the second terminal 115. The top of the second terminal 115 is squashed to fix the insulating ring 116 and the conductor ring 117 and to couple the case 113 and the lid 114 together.

Figure 29:
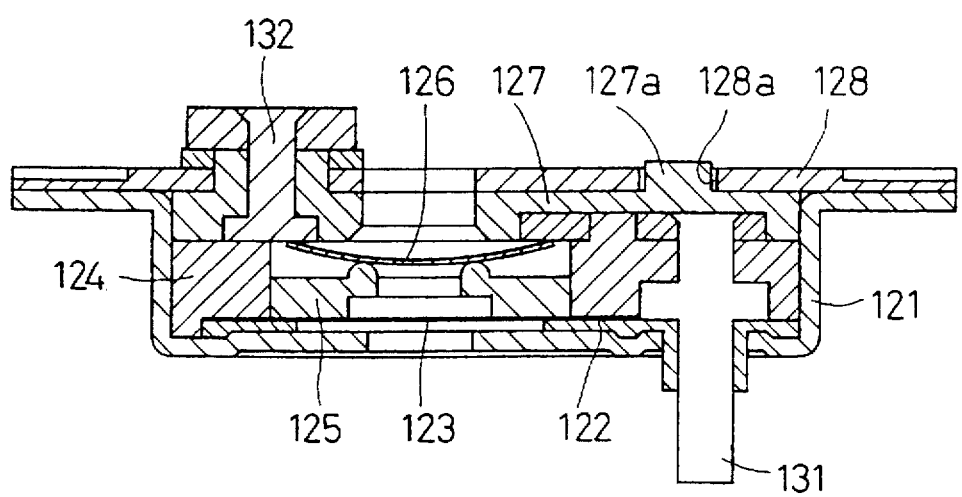
FIG. 29 is a sectional view of a tenth embodiment of the safety device according to the present invention.

FIG. 29 shows the tenth embodiment of the safety device according to this invention. This safety device has a rubber packing 122, an aluminum foil 123 and a base 124 that are superposed one on another in a case 121. The base 124 has a bore in which are received a movable member 125 and a disk spring 126 on which is placed an insulating plate 127 on which is further placed a lid 128 joined to the case 121.

The insulating member 127 has its protrusion 127a engaged in a hole 128a formed in the lid 128 to hold the case 121 in position. The first and second terminals 131 and 132 are of the same structure as those shown in FIG. 28.

In the arrangement in which the disk spring is in contact with both terminals, as in the eighth to tenth embodiments, these two terminals can be electrically disconnected by separating the disk spring from only one of the terminals.

Figure 30:
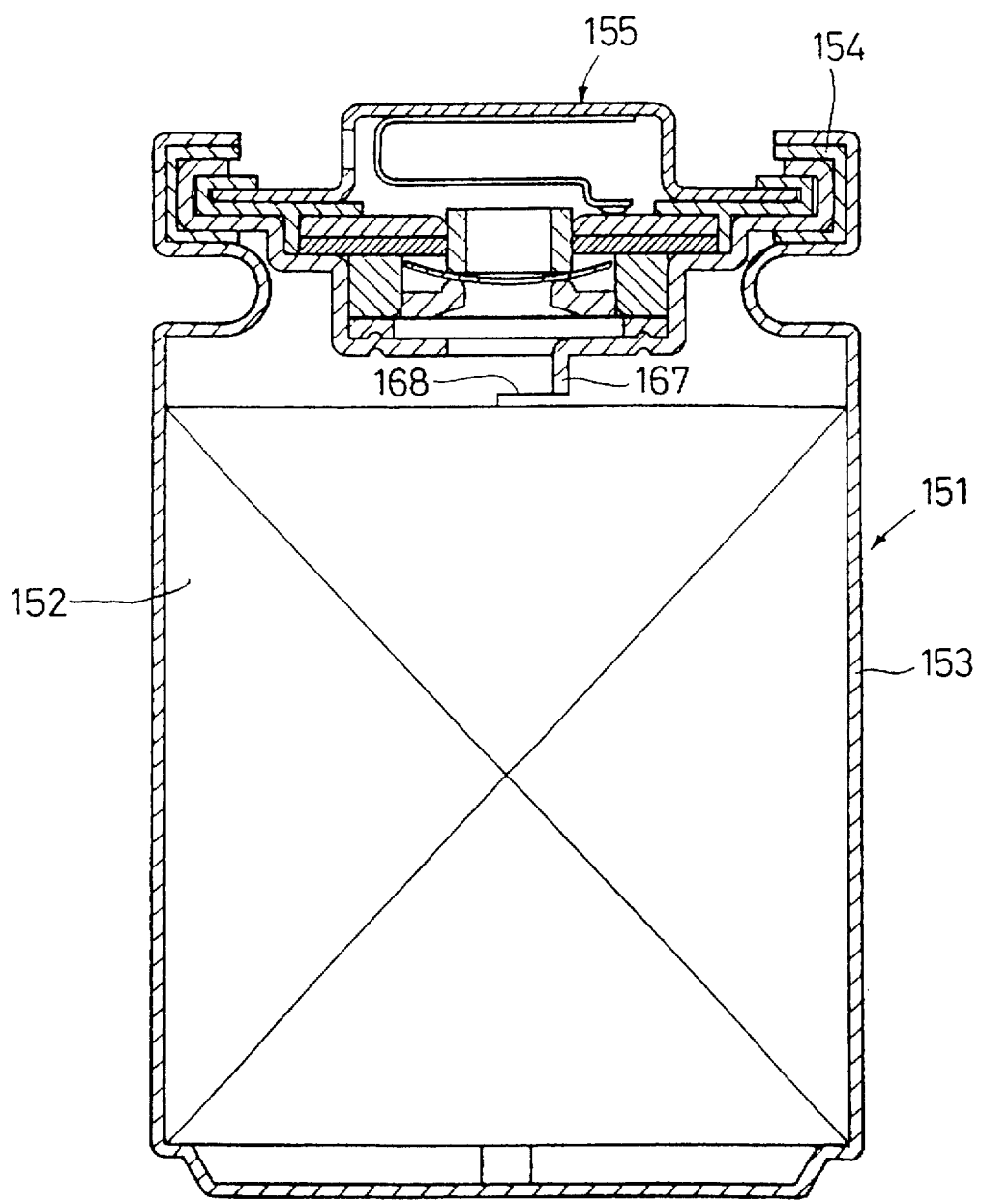
FIG. 30 is a sectional view of a secondary battery in which is used an 11th embodiment of the safety device according to the present invention.

FIG. 30 shows a secondary battery that carries a safety device of the 11th embodiment according to this invention. This secondary battery 151 has a generating unit 152 sealed in a battery case 153. The safety device 155 is supported by the caulked top edge of the battery case 153 through an insulating member 154.

Figure 31:
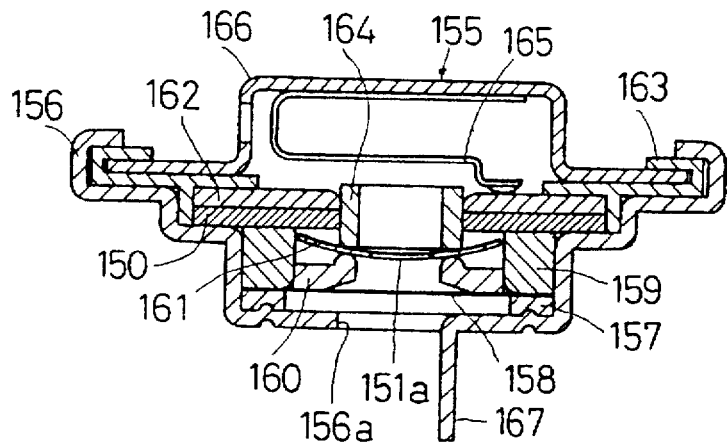
FIG. 31 is a sectional view of the safety device of FIG. 30.

As shown in FIG. 31, the safety device 155 has a gasket 157, an aluminum foil 158, a cylindrical member 159, a spacer 160, a disk spring 161, a PTC plate 150, an annular terminal 162 and an insulating seal 163 that are superposed one on another in a conductor case 156. A movable member 164 is inserted in holes formed in the PTC plate 150 and the annular terminal 162. An electrode cover 166 carrying a resistance-welded contact 165 encloses these members. The conductor case 156 has its outer edge caulked to engage the outer edge of the electrode cover 166.

The conductor case 156 has a hole 156a in its bottom so that the pressure in the battery case of the secondary battery 151 acts on the aluminum foil 158. A terminal 167 hangs down from the edge of the hole 156a. This terminal 167 is connected to the generating unit 152 through a lead 168.

The contact 165 of the electrode cover 166 is made of a sufficiently elastic material. Its tip is kept in contact with the annular terminal 162.

A current flows in the safety device 44 through: lead 168→terminal 167 of the conductor case 156→PTC plate 150→annular terminal 162→contact 165→electrode cover 166.

If an excess current flows in the battery due to overcharging or shortcircuiting, the PTC plate 150 will heat up, resulting in a sharp increase in its resistivity. The excess current thus subsides, so that overcharging or shortcircuiting can be avoided.

Figure 32:
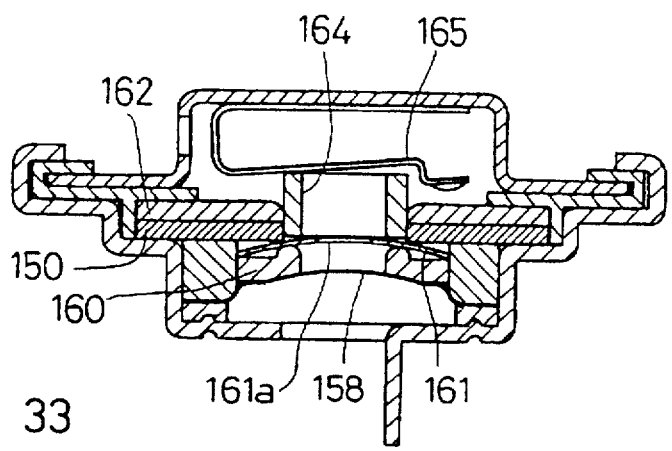
FIG. 32 is a view showing an operational state of the safety device of FIG. 31.
Figure 33:
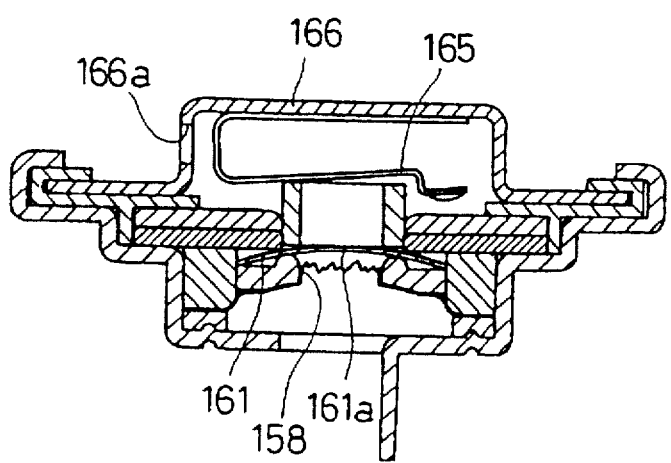
FIG. 33 is a view showing another operational state of the safety device of FIG. 31.

If the pressure in the battery case 153 keeps rising due to gas produced by the generating unit, even though an excess current is being suppressed by the PTC plate 150, the aluminum foil 158 will be deflected under the pressure in the battery case 153 as shown in FIG. 32. By being deflected, the aluminum foil 158 pushes up the spacer 160, which in turn pushes up the center of the disk spring 161 to bend it backward. The movable member 164 is thus pushed up. The ascending movable member 164 pushes up the contact 165, separating it from the annular terminal 161. The flow of current through the battery is thus cut off. The generating unit 152 will stop producing gas.

But if the pressure in the battery case 153 still keeps climbing in this state, the aluminum foil 158 will rupture, allowing the gas filling the battery case 153 to be released through the hole 161a in the disk spring 161 into the interior of the electrode cover 166 and then into the outer environment through the hole 166a of the electrode cover 166.

Thus, the safety device of this embodiment has triple safety means against explosion of the secondary battery 151, i.e. the PTC plate 150 for suppressing excess current, the disk spring 161 for cutting off the supply of electricity by bending backward, and the aluminum foil 158 adapted to release inner gas by rupturing.

Figure 34:
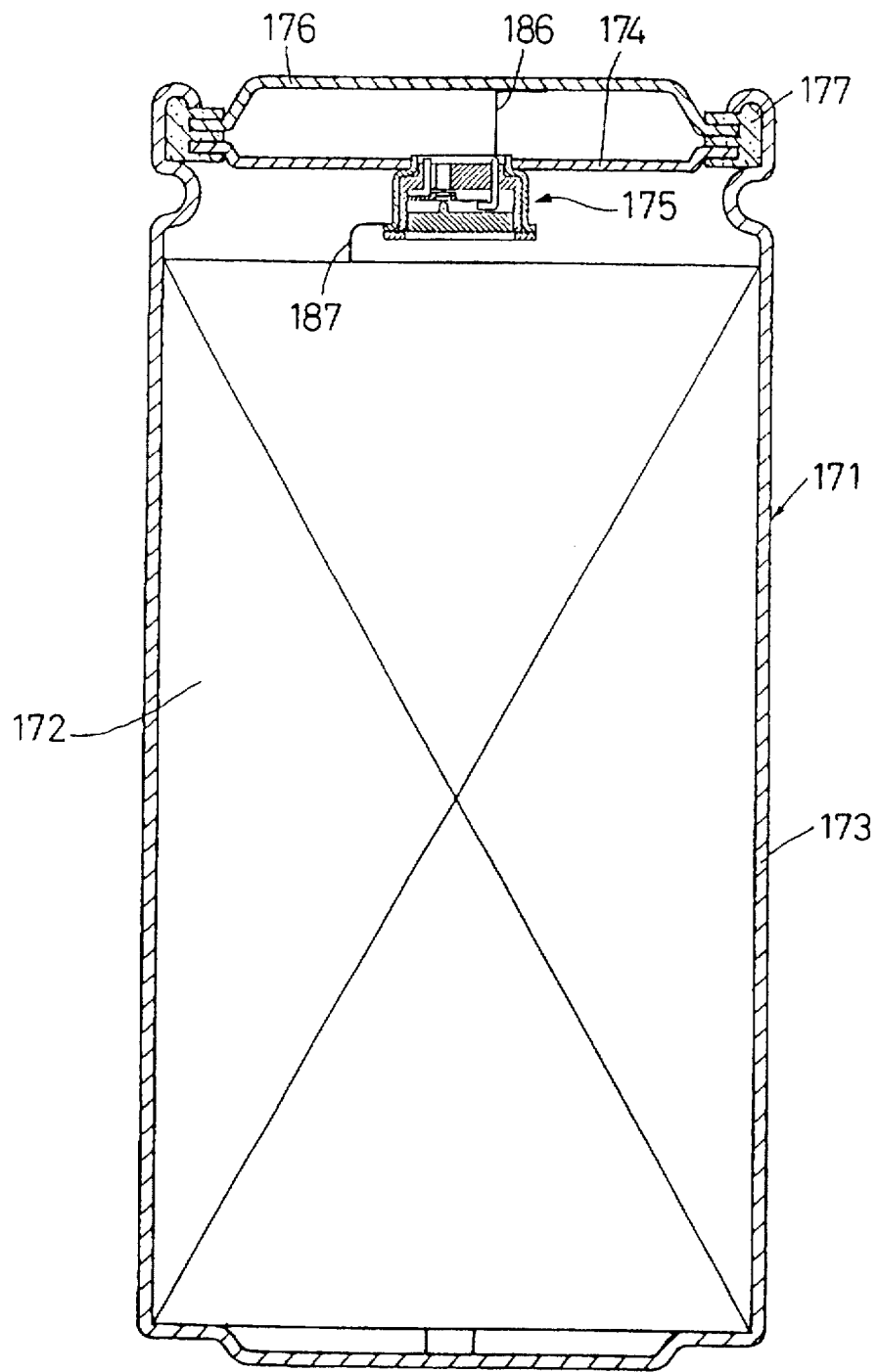
FIG. 34 is a sectional view of a secondary battery in which is used a 12th embodiment of the safety device according to the present invention.

FIG. 34 shows a secondary battery provided with a safety device of the 12th embodiment of this invention. In this embodiment. This secondary battery 171 has its safety device 175 mounted on an inner lid 174 of a battery case 173 in which is sealed a generating unit 172. The inner lid 174 and an electrode cover 176 are supported by caulking on the top end of the battery case 173 through an insulating member 177.

Figure 35:
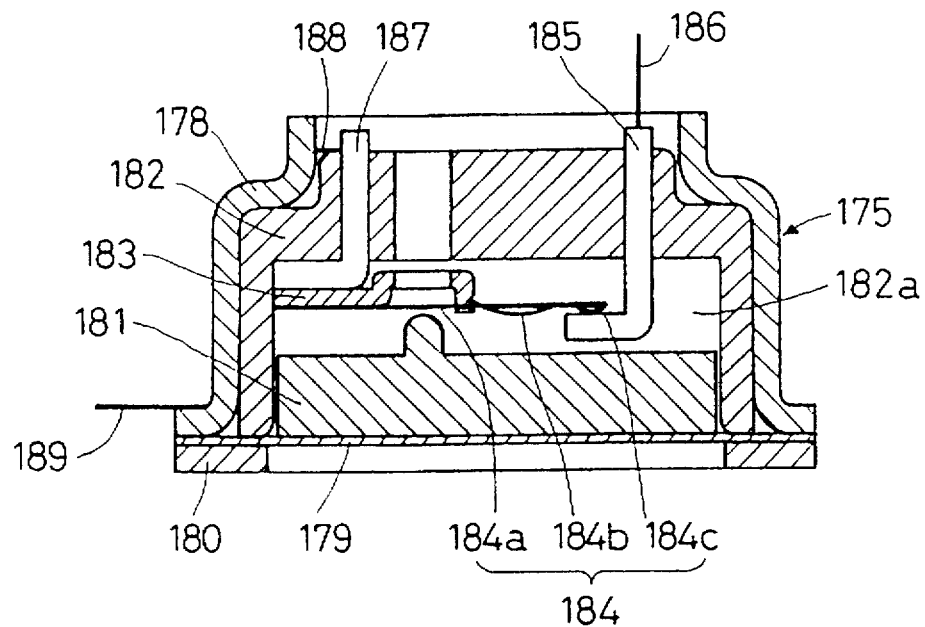
FIG. 35 is a sectional view of the safety device of FIG. 34.

Referring to FIG. 35, the safety device 175 has an aluminum foil 179 and an annular plate 180 superposed one on the other and welded (or bonded) to a substantially cylindrical conductor case 178 along the edge of its bottom opening. The conductor case 178 houses a movable member 181 and an insulating frame 182. The movable member 181 is placed on the aluminum foil 179 in a hollow 182a of the insulating frame 182.

Also provided in the hollow 182a of the insulating frame 182 is a conductive support member 183 supporting a contact 184. The contact 184 is formed by blanking a conductive plate, comprising a support portion 184a, a spring portion 184b and a contact portion 184c. The spring portion 184b is fixed at its lefthand end. This end is located at a higher level than the support portion 184a, so that the contact portion 184c is biased downward, kept in contact with a terminal 185.

The terminal 185 is connected to the electrode cover 176 through a lead 186. The other terminal 187 is connected to the generating unit 172 through a lead 188, conductor case 178 and lead 189.

A current flows in the safety device 175 through lead 189→terminal 187→conductive support member 183→contact 184→terminal 185→lead 186→electrode cover 176.

Figure 36:
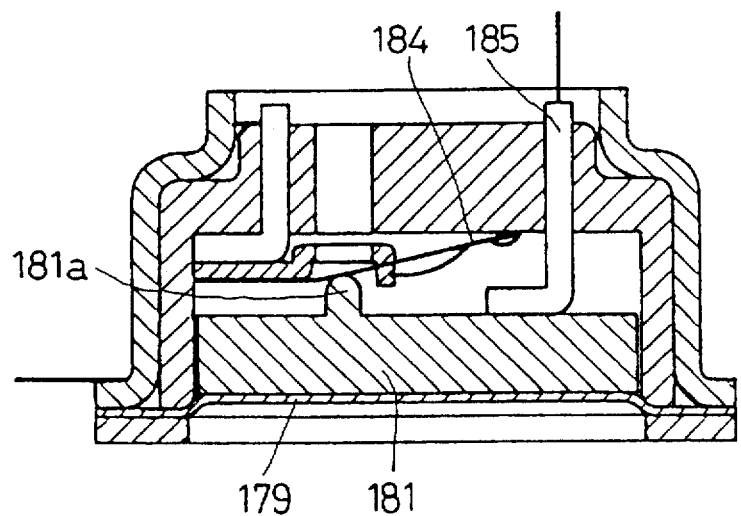
FIG. 36 is a view showing an operational state of the safety device of FIG. 34.

If gas is produced from the generating unit 172, the aluminum foil 179 is deflected under the pressure in the battery case 173 as shown in FIG. 36, pushing up the movable plate 181. As the movable plate 181 is pushed up, its protrusion 181a pushes up the contact 184, separating it from the terminal 185. The electric circuit of the safety device 175 is thus cut off. The generating unit 172 stops producing gas.

As for the contact 184, it is possible to select any desired one of many different kinds of commercially available contacts.

It is possible to provide the safety device 175 with a PTC plate to restrain excess current and/or an aluminum foil capable of releasing inner gas by rupturing.

Figure 37:
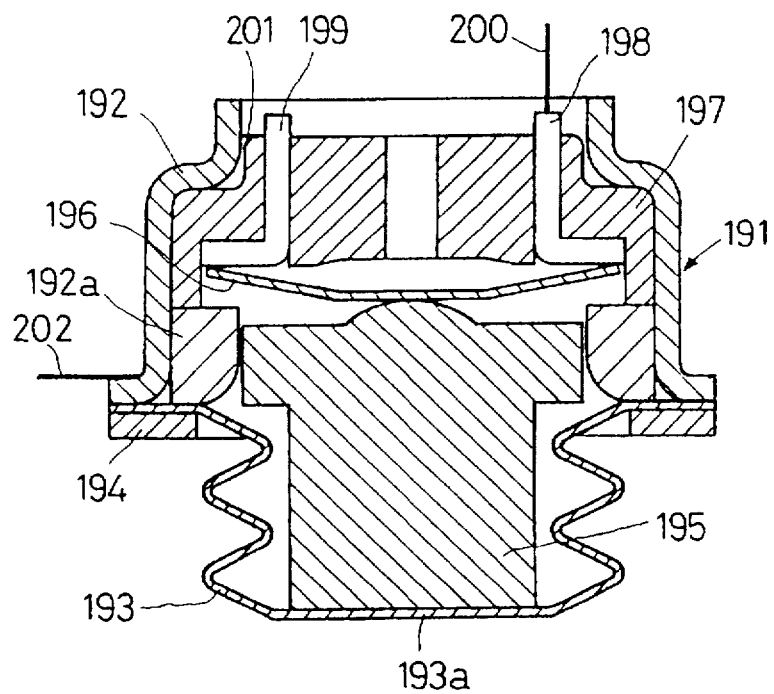
FIG. 37 is a sectional view of a 13th embodiment of the safety device according to the present invention.
Figure 38:
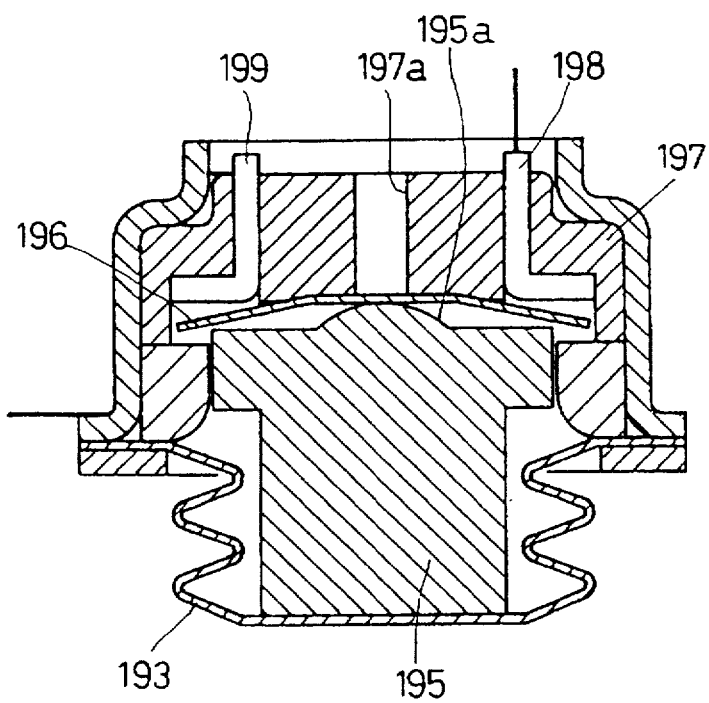
FIG. 38 is a view showing an operational state of the safety device of FIG. 37.

FIG. 37 shows a safety device of the 13th embodiment of this invention. Similar to the safety device 175, the safety device 191 of this embodiment is mounted on the inner lid 174 of the secondary battery 171 shown in FIG. 34.

This safety device has a bellows-shaped container 193 having a flange bonded to a substantially cylindrical conductor case 192 along the edge of its bottom opening. An annular plate 194 is bonded to the bottom of the flange of the container 193. The container 193 is made of a synthetic resin and has a bottom 193a and a top opening.

A cylindrical member 192a is received in the conductor case 192. It surrounds a movable member 195 mounted in the container 193. The movable member 195 supports a disk spring 196 which in turn supports an insulating frame 197.

The disk spring 196 is in contact with two terminals 198 and 199 on the insulating frame 197. The terminal 198 is connected to an electrode cover 176 of the secondary battery 171 through a lead 200. The other terminal 199 is connected to the generating unit 172 through a lead 201, conductor case 192 and lead 202.

A current flows in the safety device through lead 202 conductor case 192→lead 201 199→disk spring 196→terminal 198→lead 200→electrode cover 176.

As the pressure in the secondary battery 171 rises, the bellows-shaped container 193 will shrink, raising the movable member 195. As the movable member 195 is raised, its protrusion 195a abuts and pushes up the center of the disk spring 196. The disk spring 196 thus bends backward, separating from the terminal 198 and 199. The electric circuit is thus cut off, so that no current flows and no gas is produced.

The bellows-shaped container 193 may be made of a material other than a synthetic resin. The disk spring 196 does not necessarily have to separate from both terminals 198 and 199 when bent backward, but has to separate from at least one of them.

This safety device 191 may have a PTC plate to restrain excess current and/or an aluminum foil capable of releasing inner gas by rupturing.

A checkup of this safety device 191 can be carried out without breaking it down in the following manner.

First, judgment is made if the terminals 198 and 199 of the safety device 191 are electrically connected together. If not, the device is defective.

Then, the bellows-shaped container 193 is shrunk by raising it to push up the movable member 195 and bend the disk spring 196 backward. If the terminals 198 and 199 are still electrically connected together in this state, the device is judged to be defective.

With the disk spring bent backward, a small-diameter rod (not shown) is inserted into a hole 197a of the insulating frame 197 to bend the disk spring back to its original position by pushing its center. If, in this state, the terminals 198 and 199 are electrically connected together again, the safety device 191 is judged non-defective.

Figure 39:
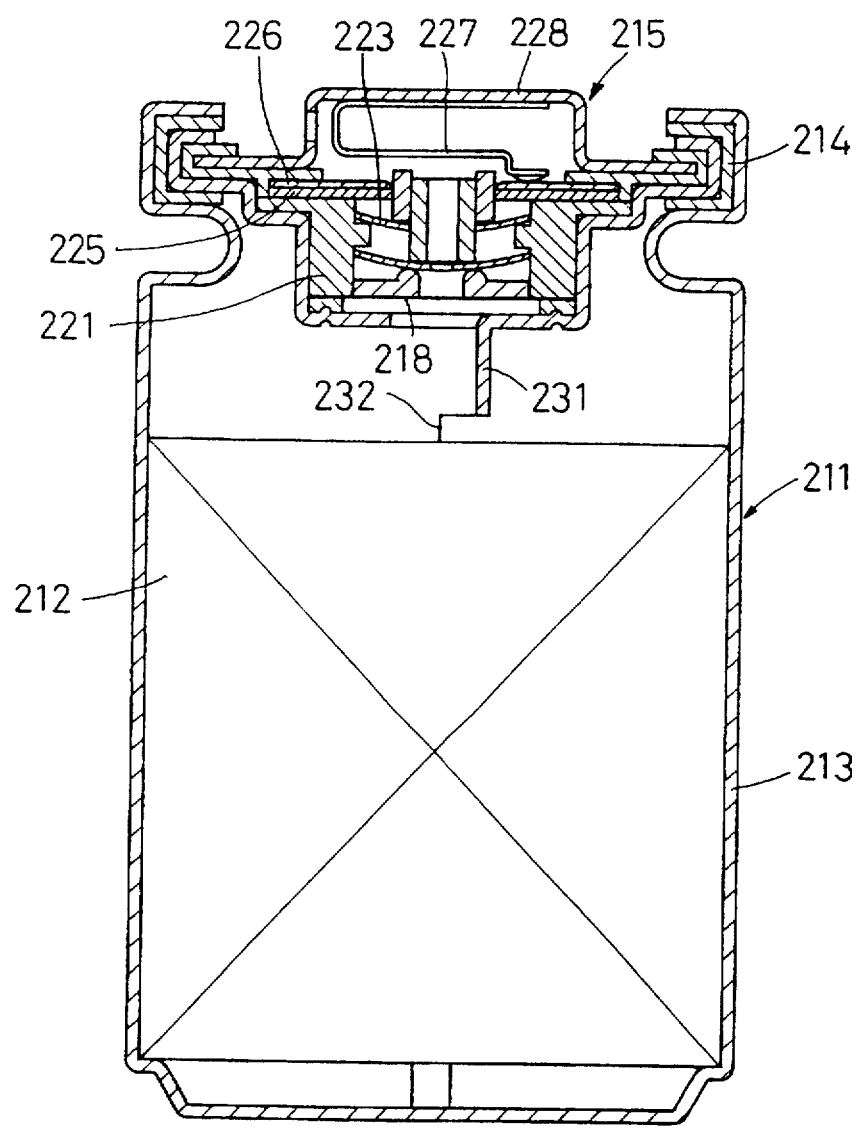
FIG. 39 is a sectional view of a secondary battery in which is used a 14th embodiment of the safety device according to the present invention.

FIG. 39 shows a secondary battery provided with a safety device of the 14th embodiment of this invention. This secondary battery 211 has its generating unit 212 sealed in a battery case 213. Its safety device 215 is supported by caulking on the top end of the battery case 213 through an insulating member 177.

Figure 40:
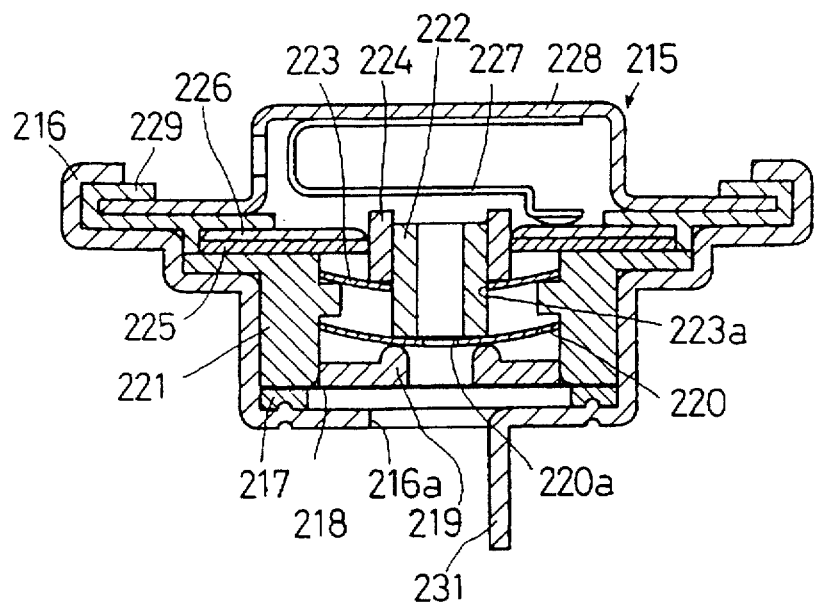
FIG. 40 is a sectional view of the safety device of FIG. 39.

Referring to FIG. 40, the safety device 215 has a gasket 217, an aluminum foil 218, a spacer 219 and a pressure-responsive perforated disk spring 220 that are superposed one on another in a conductor case 216. A cylindrical frame 221 is placed further thereon. The cylindrical frame 221 houses a pressure-responsive movable member 222, a temperature-responsive perforated disk spring 223 and a temperature-responsive movable member 224 that are superposed one on another. The cylindrical frame 221 carries a PTC plate 225 and an annular contact 226, on which is placed an electrode cover 228 having a contact 227 secured thereto by resistance welding. The conductor case 216 has its outer edge caulked to engage the outer edge of the electrode cover 228 through an insulating seal 229.

The pressure-responsive perforated disk spring 220 is made of stainless steel and has a hole 220a in the center. The temperature-responsive perforated disk spring 223 is a bimetal having a center hole 223a.

Figure 41:
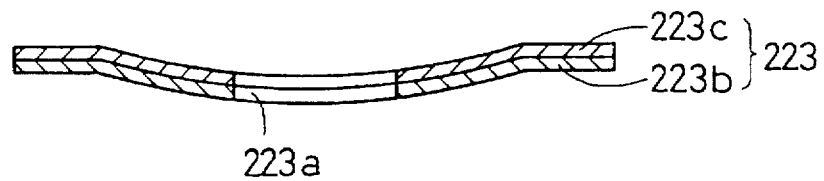
FIG. 41 is a sectional view of a disk spring used in the safety device of FIG. 40.

The temperature-responsive perforated disk spring 223 comprises two layers 223b and 223c as shown in FIG. 41. The layers 223b and 223c are made of metals having different thermal expansion coefficients. Namely, the layer 223b, which is on the convex side of the disk spring 223, has a larger thermal expansion coefficient than the layer 223c, which is on the concave side. The higher the temperature increases, the more conspicuously the layer 223c on the concave side is elongated than the other layer 223b. When the temperature of the disk spring increases to a predetermined point, i.e. when the difference in elongation between the two layers widens to a predetermined point, the disk spring 223 will bend backward.

Instead of a bimetal, a "trimetal" comprising three layers may be used as the disk spring 223.

The pressure-responsive movable member 222 and the temperature-responsive movable member 224 are both cylindrical members. The pressure-responsive movable member 222 extends through the hole 223a of the temperature-responsive perforated disk spring 223 and is inserted in the temperature-responsive movable member 224.

The conductor case 216 has a hole 216a in its bottom, so that the pressure in the secondary battery is applied through the hole 216a of the conductor case 216 to the aluminum foil 218. A terminal 231 hangs down from the edge of the hole 216a. It is connected through a lead 232 to the generating unit 212.

The contact 227 of the electrode cover 228 is made of a sufficiently elastic material. Its tip is kept in contact with the annular terminal 226.

A current flows in the safety device 215 through: generating unit 212→lead 232→terminal 231 of the conductor case 216→cylindrical frame 221→PTC plate 225 annular terminal 226→contact 227→electrode cover 228.

If an excess current flows in the battery due to overcharging or shortcircuiting, the PTC plate 225 will heat up, resulting in a sharp increase in its resistivity. The excess current thus subsides, so that overcharging or shortcircuiting can be avoided.

Suppose now that generating unit 212 heats up due to overloading, even though an excess current is being suppressed by the PTC plate 225.

Figure 42:
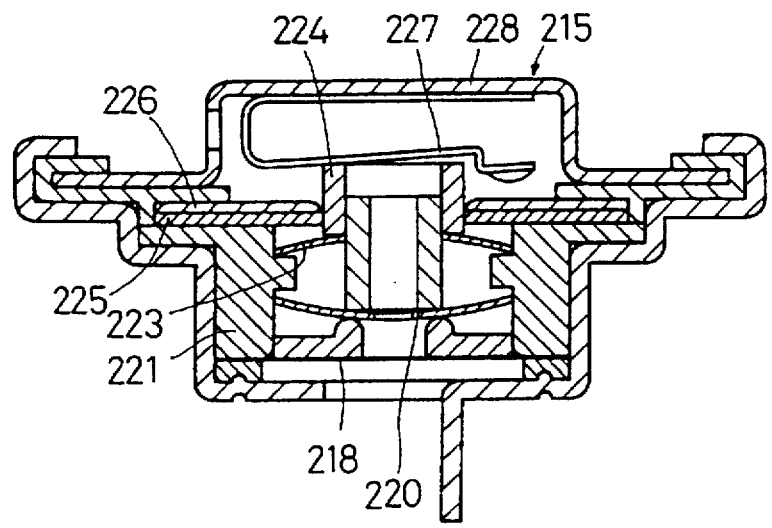
FIG. 42 is a view showing an operational state of the safety device of FIG. 40.

In such a case, the heat produced from the generating unit 212 is conducted through the battery case 213, conductor case 216 and cylindrical frame 221 to the temperature-responsive perforated disk spring 223. Otherwise, the current flow path in the safety device 215 may heat up due to excess current. The heat thus produced is conducted to the temperature-responsive perforated disk spring 223. In either case, the temperature-responsive perforated disk spring 223 heats up gradually. When the temperature of the temperature-responsive perforated disk spring 223 reaches a predetermined level, this disk spring 223 will bend backward as shown in FIG. 42, thus pushing up the temperature-responsive movable member 224. The temperature-responsive movable member 224 in turn pushes up the contact 227, separating the contact 227 from the annular terminal 226. The current flow path in the safety device 215 is thus cut off, so that the generating unit 212 will not heat up any more.

Figure 43:
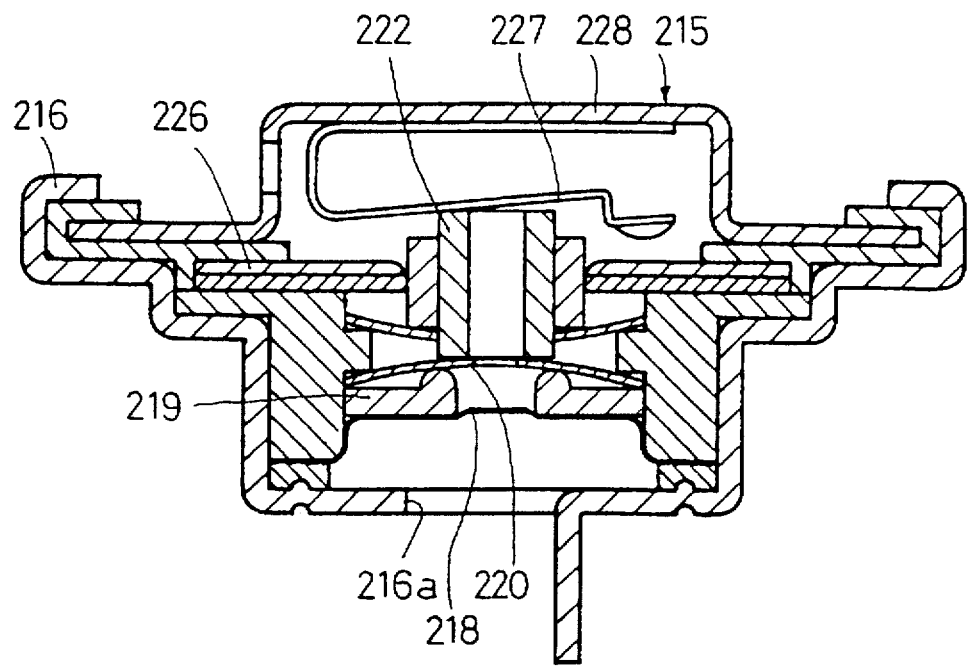
FIG. 43 is a view showing another operational state of the safety device of FIG. 40.

If the generating unit 212 should produce gas explosively due to overloading, the aluminum foil 218 will be deflected upward as shown in FIG. 43 because the pressure in the battery case 213 increases quickly. The foil 218 thus pushes up the spacer 219, which in turn pushes up the pressure-responsive perforated disk spring 220. When this pressure reaches a predetermined level, the disk spring will bend backward, pushing up the pressure-responsive movable member 222 and thus the contact 227. The tip of the contact 227 thus separates from the annular terminal 226. The current flow path is now cut off.

Figure 44:
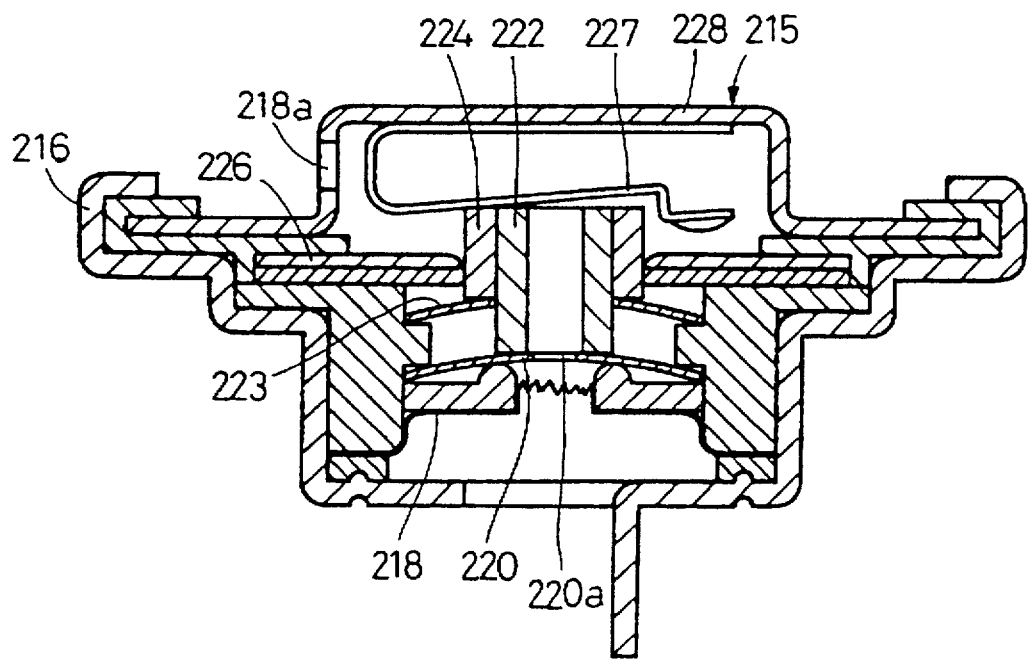
FIG. 44 is a view showing still another operational state of the safety device of FIG. 40.

But if the pressure in the battery case 213 still keeps climbing in this state, the aluminum foil 218 will rupture as shown in FIG. 44, allowing the gas filling the battery case 213 to be released through the hole 220a in the pressure-responsive disk spring 220 and through the pressure-responsive movable member 222 into the interior of the electrode cover 228 and then into the outer environment through the hole 228a of the electrode cover 228.

Thus, the safety device of this embodiment has quadruple safety means against explosion of the secondary battery 211, i.e. the PTC plate 225 for suppressing excess current, the temperature-responsive perforated disk spring 223 and the pressure-responsive perforated disk spring 220 for cutting off the supply of electricity by bending backward, and the aluminum foil 158 adapted to release inner gas by rupturing.

Instead of the pressure-responsive disk spring 220, the disk spring 48 shown in FIG. 9 may be used. In this case, the aluminum foil 218 and the spacer 219 are omitted.

Figure 45:
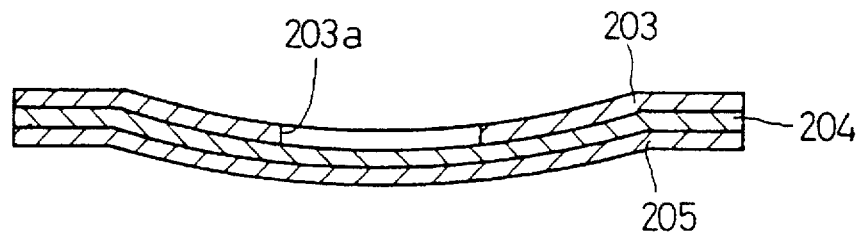
FIG. 45 is a sectional view of another type of disk spring used in the safety device of FIG. 40.

Otherwise, the disk spring 220 may be replaced with a disk spring 203 shown in FIG. 45, which is a disk spring of the second embodiment of this invention. This disk spring 203 has a center hole 203a which is closed by a synthetic resin film 204 and an aluminum foil 205. The synthetic resin film 204 is disposed between the disk spring 203 and the aluminum foil 205 to prevent electrolytic corrosion that tends to occur between two different kinds of metals.

To use this disk spring 203, it is necessary to hermetically seal its edge to prevent gas leakage. If the disk spring bends backward under the pressure in the battery case 213, it pushes up the pressure-responsive movable member 222 and thus the contact 227. The tip of the contact 227 thus separates from the annular terminal 226. If the pressure in the battery case 213 still keeps rising in this state, the synthetic resin film 204 and the aluminum foil 205 covering the hole 203a of the disk spring 203 will rupture, allowing the gas in the battery case 213 to be released through the hole 203a in the disk spring 203. Thus, this spring 203 serves as both the aluminum plate 218 and the pressure-responsive disk spring 220.

Figure 46:
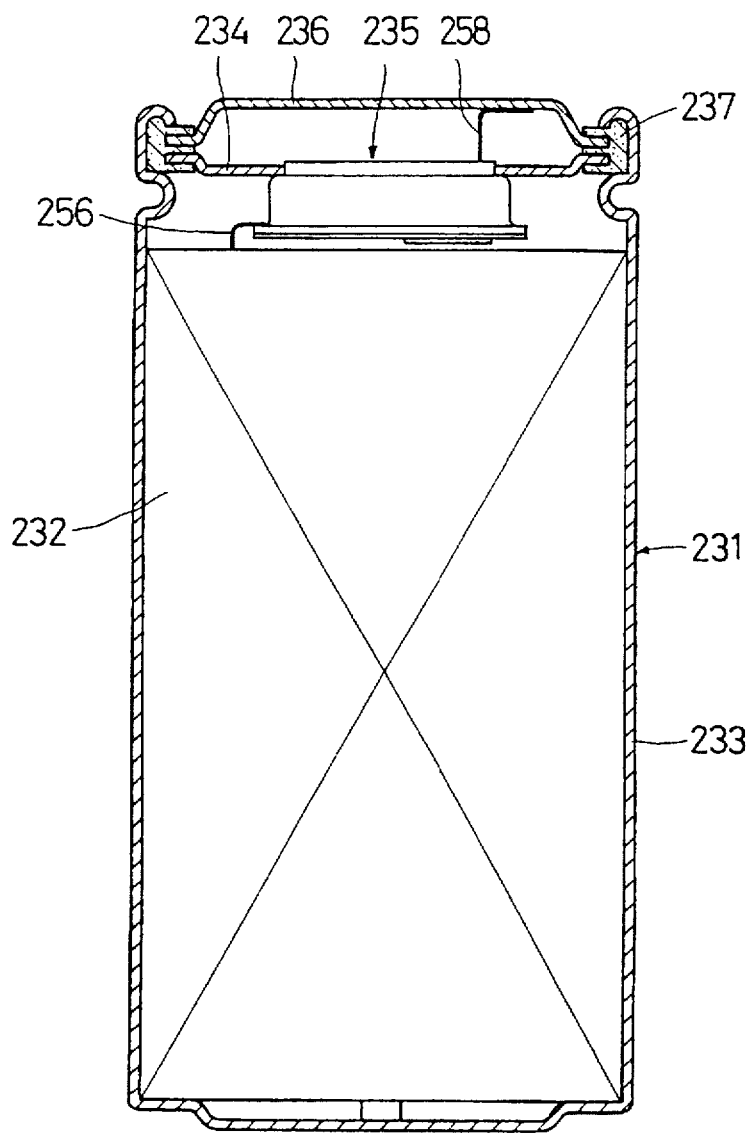
FIG. 46 is a sectional view of a secondary battery in which is used a 15th embodiment of the safety device according to the present invention.

FIG. 46 shows a secondary battery having a safety device of the 15th embodiment of this invention. This secondary battery 231 has its safety device 235 mounted on an inner lid 234 of a battery case 233 in which is sealed a generating unit 232. The inner lid 234 and an electrode cover 236 are supported by caulking on the top end of the battery case 233 through an insulating member 237.

Figure 47:
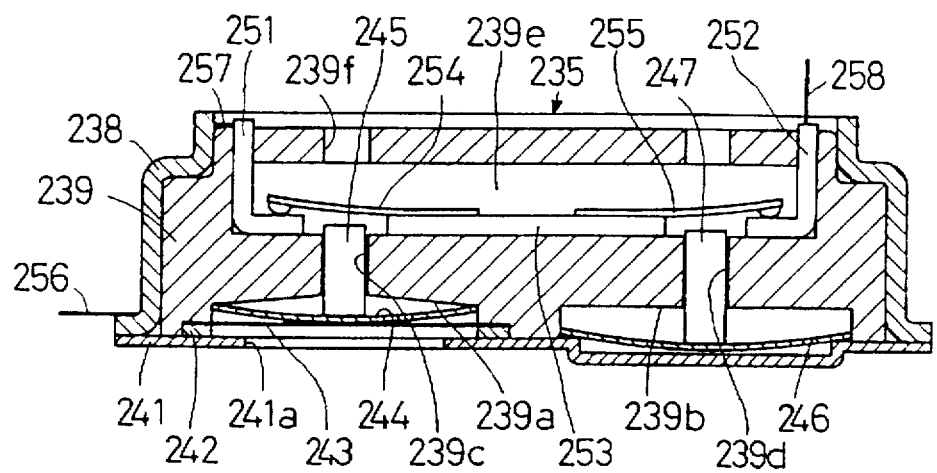
FIG. 47 is a sectional view of the safety device of FIG. 46.

As shown in FIG. 47, the safety device 235 has an insulating frame 239 mounted in a conductor case 238. A bottom plate 241 is welded to the conductor case 238 along the edge of its bottom opening. Two recesses 239a and 239b are formed in the bottom surface of the insulating frame 239.

In the recess 239a of the insulating frame 239, a gasket 242, an aluminum foil 243 and a pressure-responsive disk spring 244 are superposed one on another. The pressure-responsive disk spring 244 supports a pressure-responsive movable member 245 inserted in a hole 239c of the insulating frame 239. The aluminum foil 243 faces the interior of the battery case 233 through a hole 241a in the bottom plate 241. The pressure-responsive disk spring 244 is made of stainless steel.

A temperature-responsive disk spring 246 is received in the recess 239b in the insulating frame 239. The disk spring 246 supports a temperature-responsive movable member 247 inserted in a hole 239d formed in the insulating frame 239. The temperature-responsive disk spring 246 is a bimetal adapted to bend backward when heated to a predetermined temperature.

The insulating frame 239 has a cell 239e in which are provided two terminals 251 and 252, a pressure-responsive contact 254 and a temperature-responsive contact 255. The pressure-responsive contact 254 is partially in contact with a conductor 253, while its tip is in contact with the terminal 251. Similarly, the temperature-responsive contact 255 is partially in contact with the conductor 253 with its tip in contact with the terminal 252.

The generating unit 232 of the secondary battery 231 is connected to the conductor case 238 via a lead 256. The conductor case 238 is in turn connected to the terminal through a lead 257. A lead 258 connects the terminal 252 to the electrode cover 236.

Thus, a current flows in the safety device 235 through generating unit 232→lead 256→conductor case 238→lead 257→terminal 25→pressure-responsive contact 254→conductor 253→temperature-responsive contact 25→terminal 252→lead 258→electrode cover 236.

Figure 48:
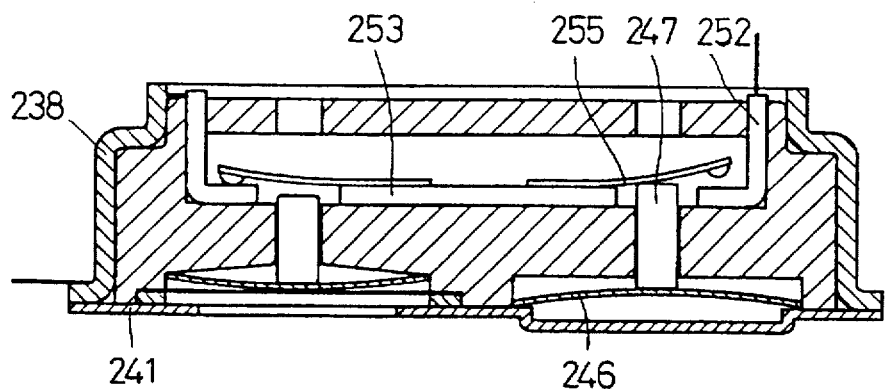
FIG. 48 is a view showing an operational state of the safety device of FIG. 46.

If the generating unit 232 heats up due to overcharging or shortcircuiting, the heat of the generating unit 232 is conducted through the conductor case 238 and the bottom plate 241 to the temperature-responsive disk spring 246, heating the temperature-responsive disk spring 246. When the temperature-responsive disk spring 246 is heated to a predetermined temperature, it bends backward as shown in FIG. 48, pushing up the temperature-responsive contact 255 together with the temperature-responsive movable member 247 until the tip of the temperature-responsive contact 252 separates from the terminal 255. The current flow passage is cut off, so that the generating unit 232 stops producing heat.

Figure 49:
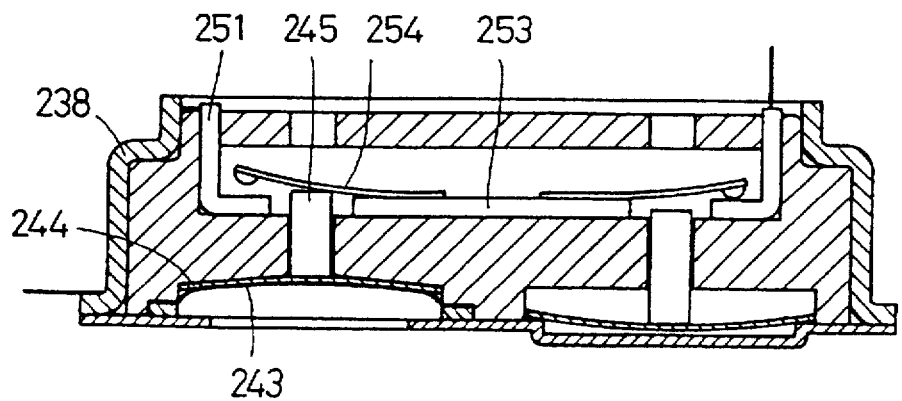
FIG. 49 is a view showing a different operational state of the safety device of FIG. 46.

If gas is produced from the generating unit 232, the pressure in the battery case 233 increases. This pressure is applied to the aluminum foil 243 and then to the pressure-responsive disk spring 244. When the pressure reaches a predetermined level, the pressure-responsive disk spring 244 bends back as shown in FIG. 49, pushing up the pressure-responsive contact 254 through the pressure-responsive movable member 245 until the tip of the pressure-responsive contact 254 separates from the terminal 251. The current flow thus stops.

Namely, the safety device 235 stops the current flow by bending the temperature-responsive disk spring 246 or the pressure-responsive disk spring 244.

By using a cylindrical pressure-responsive movable member 245 and forming a hole in the center of the pressure-responsive disk spring 244, if the pressure in the battery case 233 increases excessively, causing the aluminum foil 243 to rupture, the gas in the battery case 233 will be released through the hole in the pressure-responsive disk spring 244 and through the pressure-responsive movable member 245 into the cell 239e in the insulating frame 239, and then through the hole 239f in the insulating frame 239 into the outer environment.

In the arrangement in which the inner gas is released, it is possible to omit the aluminum foil 243 and/or to replace the pressure-responsive disk spring 244 with the disk spring shown in FIG. 9 or 45.

Also, a PTC plate may be provided in the current flow path to restrain excess current.

Figure 50:
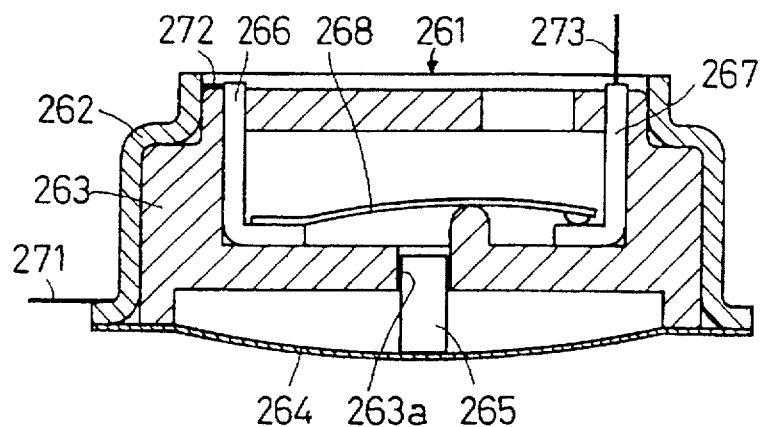
FIG. 50 is a sectional view of a 16th embodiment of the safety device according to the present invention.

FIG. 50 shows the 16th embodiment of the safety device according to this invention. Similar to the safety device 235 shown in FIG. 46, this safety device 261 is mounted on the inner lid 234 of the secondary battery 231.

The safety device 261 has a hollow insulating frame 263 mounted in a conductor case 262. A pressure-responsive disk spring 264 is welded to the conductor case 262 along the edge of its bottom opening to close this opening. The insulating frame 263 has a center hole 263a in which is inserted a movable member 265 supported on the pressure-responsive disk spring 264. The insulating frame 263 carries two terminals 266 and 267. A temperature-responsive contact 268 has its lefthand end joined to the terminal and its right end in contact with the other terminal 267.

The pressure-responsive disk spring 264 is made of stainless steel. The temperature-responsive contact is a bimetallic disk spring adapted to bend back at a predetermined temperature.

A current flows in the safety device 261 through generating unit 232→lead 271→conductor case 262→lead 272→terminal 266→temperature-responsive contact 268→terminal 267→lead 273→electrode cover 236.

Figure 51:
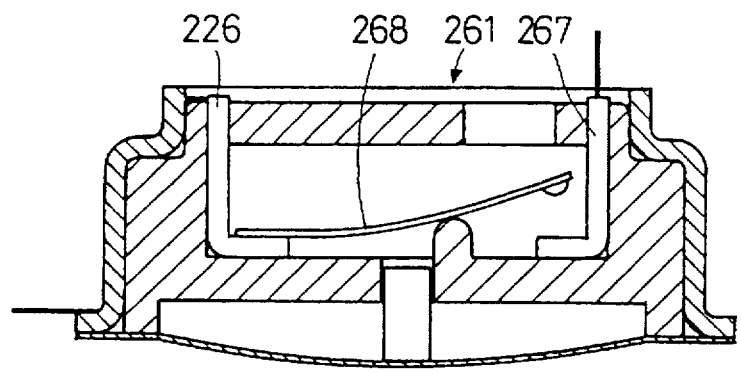
FIG. 51 is a view showing an operational state of the safety device of FIG. 50.

If heat is produced from the generating unit 232 due to overcharging, this heat is conducted through the insulating frame 263 and its terminals 266, 267 to the temperature-responsive contact 268. When the contact 268 is heated to a predetermined temperature, it bends back as shown in FIG. 51, so that its right end separates from the terminal 267, cutting off the current flow path. The generating unit 232 stops producing heat.

Figure 52:
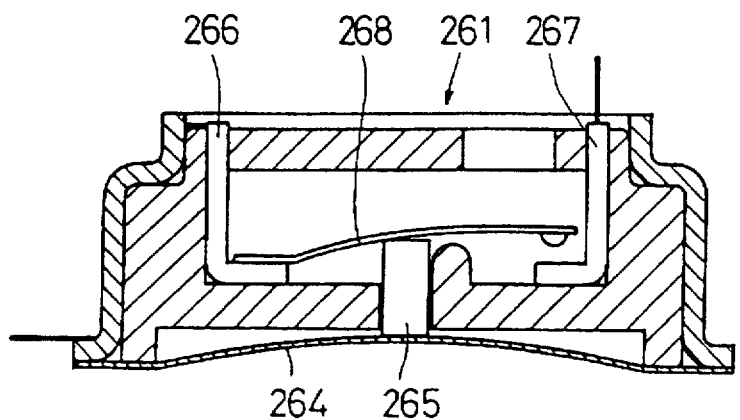
FIG. 52 is a view showing a different operational state of the safety device of FIG. 50.

If gas is produced from the generating unit 232, the pressure in the battery case 233 increases. This pressure is applied to the pressure-responsive disk spring 264. When the pressure reaches a predetermined level, the pressure-responsive disk spring 264 bends back as shown in FIG. 52, pushing up the pressure-responsive contact 268 through the movable member 265 until the right end of the temperature-responsive contact 268 separates from the terminal 267. The current flow thus stops.

Namely, in this safety device 261, the current flow stops if the temperature-responsive contact 268 bends back by heating itself up, or if the pressure-responsive disk spring 264 springs back.

By using a cylindrical movable member 265 and replacing the pressure-responsive disk spring 264 with the disk spring shown in FIG. 9 or 45, if the pressure in the battery case 233 increases excessively, causing the synthetic resin film or the aluminum foil 243 to rupture, the gas in the battery case 233 will be released through the hole in the disk spring and through the movable member 265.

A PTC plate may be provided in the current flow path to restrain excess current.

Figure 53:
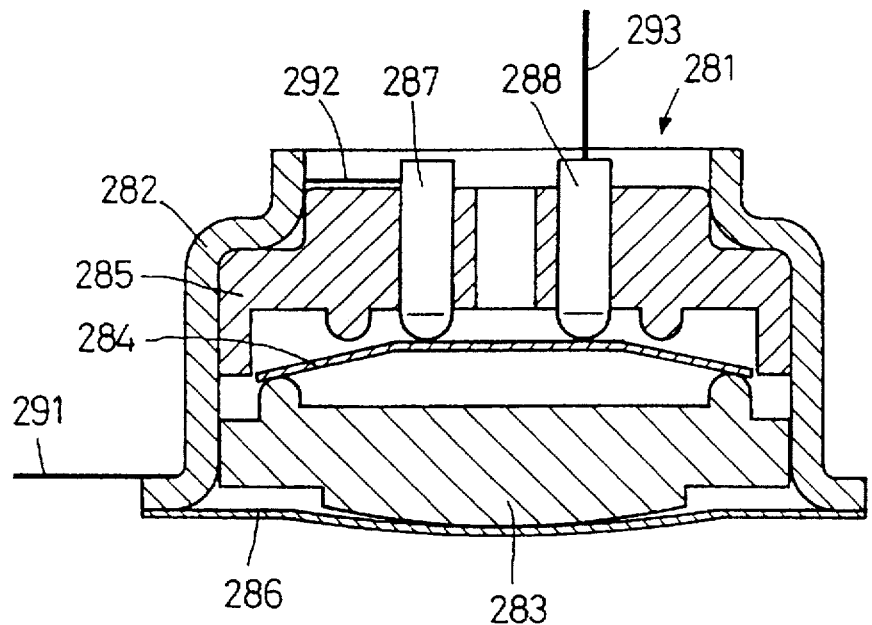
FIG. 53 is a sectional view of a 17th embodiment of the safety device according to the present invention.
Figure 54:
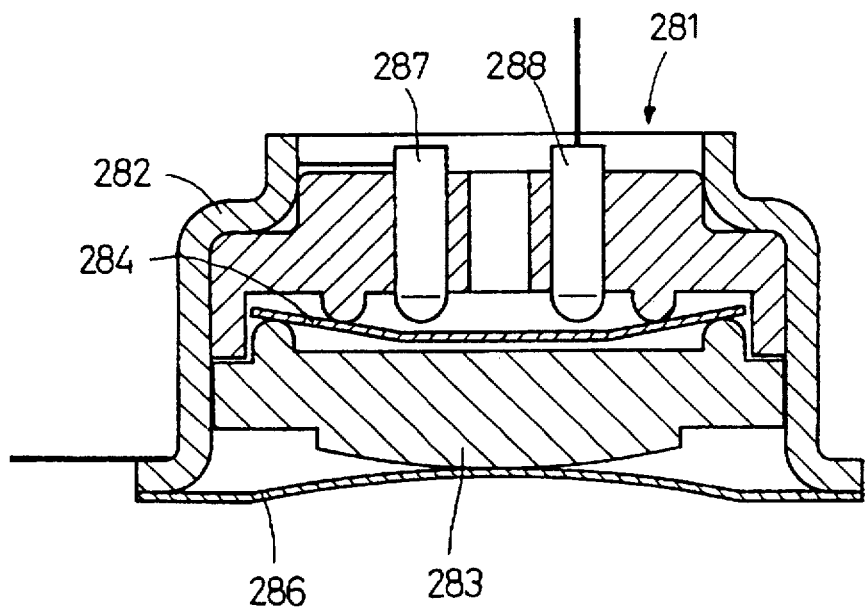
FIG. 54 is a view showing an operational state of the safety device of FIG. 53.

FIG. 53 shows the 17th embodiment of the safety device of this invention. Similar to the safety device 235 shown in FIG. 46, this safety device 281 is mounted on the inner lid 234 of the secondary battery 231.

This safety device 281 has a movable member 283, a contact 284 and an insulating frame superposed one on another in a conductor case 282. A pressure- and temperature-responsive disk spring 286 is welded to the conductor case 282 along the edge of its bottom opening to close this opening. Two terminals 287 and 288 are buried in the insulating frame 285. These terminals 287 and 28 8 are both in contact with the contact 284.

The pressure- and temperature-responsive disk spring 286 is a bimetallic disk spring adapted to bend back at a predetermined temperature.

A current flows in this safety device 281 through generating unit 232→lead 291→conductor case 282→lead 292→terminal 287→contact 284→terminal 288→lead 293→electrode cover 236.

If the generating unit 232 heats up and the pressure- and temperature-responsive disk spring 286 is heated to a predetermined temperature, or if the pressure in the battery case 233 increases to a predetermined level, the pressure- and temperature-responsive disk spring 286 springs back, pushing up the contact 284 through the movable member 283 until the contact 284 separates from the terminals 287 and 288. The current flow thus stops.

Since the pressure- and temperature-responsive disk spring 286 is responsive to both pressure and temperature, it will spring back even at a low temperature if the pressure is high, or even at a low pressure if the temperature is high. In short, both the temperature and pressure at which this disk spring 286 bends back vary.

By forming a hole in the center of the movable member 283 and replacing the pressure- and temperature-responsive disk spring 286 with the disk spring 203 shown in FIG. 45, if the pressure in the battery case 233 increases excessively, causing the synthetic resin film 204 or the aluminum foil 205 to rupture, the gas in the battery case 233 will be released through the hole 203a in the disk spring 203 and through hole in the movable member 283.

Also, a PTC plate may be provided in the current flow path to restrain excess current.

The safety device according to this invention is not limited to the specific types shown in the above embodiments. Namely, it is possible to vary the shapes and dispositions of the components parts shown in the embodiments. Caulking and resistance welding are used to join parts together. But instead, parts may be joined tog ether, fixed in position and sealed by ultrasonic welding, laser beam welding, screwing, resin molding, etc. Also, they may be formed from any desired materials that are most suited for achieving the object of the invention. In short, this invention is not limited in the shapes and dispositions of its component parts, in the manner in which its parts are joined, fixed and sealed, and in the materials for the component parts.

We will now describe in detail the disk spring 48 shown in FIG. 9 as the first embodiment, and the spring 203 of the second embodiment shown in FIG. 45.

The disk spring 203 shown in FIG. 45 is made of stainless steel and has a hole 203a in the center which is closed by the synthetic resin film 204 and the aluminum foil 205. The synthetic resin film 204 is disposed between the disk spring 203 and the aluminum foil 205 to prevent electrolytic corrosion that may develop between different kinds of metals.

Figure 55:
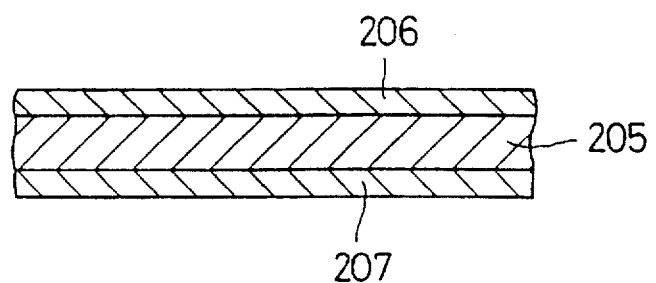
FIG. 55 is an enlarged sectional view of a sheet of a disk spring according to the present invention.

The synthetic resin film 204 and the aluminum foil 205 may be simply laminated one on another or may be bonded together. If they are bonded together, a solvent for the synthetic resin film 204 or an adhesive is used, or they are fused together by heating. Otherwise, as shown in FIG. 55, synthetic resin films 206 and 207 may be laminated on both sides of the aluminum foil 205.

The aluminum foil may be formed on one side of the synthetic resin film by deposition. Also, an aluminum foil may be sandwiched between two synthetic resin films.

The aluminum foil may be bonded to the disk spring 203 by applying a synthetic resin paint or an adhesive to one side of the aluminum foil and laminating the aluminum foil on the disk spring with the synthetic resin paint or adhesive layer inside. Such synthetic resin paint or adhesive may be applied to both sides of the aluminum foil.

If the disk spring and the metal foil covering the hole of the disk spring are made of the same material, or if the disk spring is used in an electric corrosion-free environment, the synthetic resin film may be omitted. That is, the metal foil may be directly laminated on the disk spring. Also, only the synthetic resin may be laminated on the disk spring. Namely, the aluminum foil may be omitted.

Figure 56:
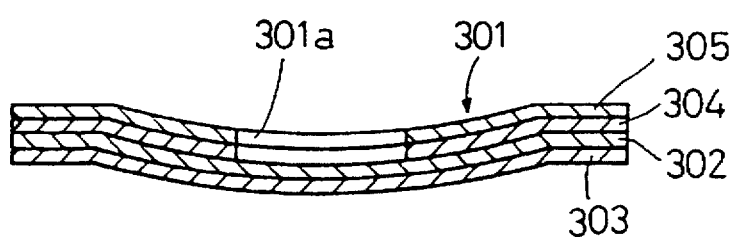
FIG. 56 is a sectional view of a third embodiment of the disk spring according to the present invention.

FIG. 56 shows the third embodiment of the disk spring of this invention. This disk spring is a bimetal having a center hole 301a, which is closed by a synthetic resin film 302 and an aluminum foil 303.

The disk spring 301 comprises two layers 304 and 305 made of metals having different thermal expansion coefficients. The layer 304 on the convex side of the disk spring 301 has a larger thermal expansion coefficient than the layer 305 on the concave side. When the disk spring 301 is heated to a predetermined temperature, it is adapted to spring back. The disk spring may be a two-layer bimetal or a three-layer bimetal.

What is claimed is:

1. A safety device for use in a secondary battery having a battery case defining an opening, and a generating unit airtightly housed in said battery case, said safety device comprising:

a sealing sheet for closing the opening and having one side thereof facing the interior of the battery case through the opening;

a disk spring provided on the other side of said sealing sheet and having a first side and a second side, said disk spring being bendable outwardly upon application of a predetermined pressure applied to said disk spring through said sealing sheet; and a switch disposed adjacent to said second side of said disk spring and being movable in response to outward bending of said disk spring, wherein said switch is positionable in a current flow path of the secondary battery.

2. The safety device claimed in claim 1, further comprising a passage provided so as to extend from an exterior surface of said safety device to a location adjacent said disk spring, wherein said disk spring can be pushed inwardly into a normal position by a pushing means introduced through said passage from exterior of the battery case.

3. The safety device claimed in claim 1, further comprising a positive-character thermistor positionable in the current flow path of said second secondary battery.

4. The safety device claimed in claim 1, wherein the battery case defines a hole closed by a film which can rupture if the interior pressure in the battery case exceeds a predetermined level.

* * * * *